US 9,489,370 B2

United States Patent
Onishi et al.

(10) Patent No.: US 9,489,370 B2
(45) Date of Patent: Nov. 8, 2016

(54) SYNONYM RELATION DETERMINATION DEVICE, SYNONYM RELATION DETERMINATION METHOD, AND PROGRAM THEREOF

(71) Applicant: NEC Corporation, Tokyo (JP)

(72) Inventors: Takashi Onishi, Tokyo (JP); Kai Ishikawa, Tokyo (JP); Masaaki Tsuchida, Tokyo (JP)

(73) Assignee: NEC Corporation, Tokyo (JP)

( * ) Notice: Subject to any disclaimer, the term of this patent is extended or adjusted under 35 U.S.C. 154(b) by 220 days.

(21) Appl. No.: 14/389,462

(22) PCT Filed: Mar. 26, 2013

(86) PCT No.: PCT/JP2013/058696
§ 371 (c)(1),
(2) Date: Sep. 30, 2014

(87) PCT Pub. No.: WO2013/146736
PCT Pub. Date: Oct. 3, 2013

(65) Prior Publication Data
US 2015/0066478 A1 Mar. 5, 2015

(30) Foreign Application Priority Data
Mar. 30, 2012 (JP) .................. 2012-082722

(51) Int. Cl.
G06F 17/27 (2006.01)
(52) U.S. Cl.
CPC ........... G06F 17/27 (2013.01); G06F 17/2785 (2013.01)
(58) Field of Classification Search
CPC ............... G06F 17/27; G06F 17/2785; G06F 17/2795; G06F 17/30737; G06F 17/21
USPC ...................... 704/9, 10, 239, 257
See application file for complete search history.

(56) References Cited

U.S. PATENT DOCUMENTS

| 5,732,260 A | 3/1998 | Nomiyama |
| 7,636,714 B1 | 12/2009 | Lamping et al. |
| 7,925,498 B1 | 4/2011 | Baker et al. |
| 8,001,136 B1 | 8/2011 | Papachristou et al. |

(Continued)

FOREIGN PATENT DOCUMENTS

| JP | 8-77178 | 3/1996 |
| JP | 11-312168 | 9/1999 |
| JP | 2003-296354 | 10/2003 |

OTHER PUBLICATIONS

M. Ohkubo et al., "Extracting Information Demand by Analyzing a WWW Search Log", Transactions of Information Processing Society of Japan, vol. 39, No. 7, Information Processing Society of Japan, pp. 2250-2258, Jul. 1998.

(Continued)

Primary Examiner — Thierry L Pham
(74) Attorney, Agent, or Firm — Finnegan, Henderson, Farabow, Garrett & Dunner LLP

(57) ABSTRACT

A synonym relation determination device comprises: a synonym expression candidate storage unit which associates and stores a synonym candidate (EW) with the synonym source (OW); a text gathering unit which associates and gathers text with an issuing time; a synonym candidate search unit which calculates from the issuing time of the text a time interval (PD) in which the synonym candidate is searched in a text set (TX); a synonym source search unit which searches for a synonym source from the text set of a period which overlaps with the time interval in which the synonym candidate is searched for and calculates an occurrence of the synonym source; and synonym relation extraction unit which, when the occurrence of the synonym source is present in the time interval in which the synonym candidate is searched for, extracts a synonym relation between the synonym candidate and the synonym source.

11 Claims, 15 Drawing Sheets

(56) References Cited

U.S. PATENT DOCUMENTS

| | | |
|---|---|---|
| 8,037,086 B1 | 10/2011 | Upstill et al. |
| 8,285,738 B1 | 10/2012 | Upstill et al. |
| 2010/0082657 A1 | 4/2010 | Paparizos et al. |
| 2011/0137641 A1 | 6/2011 | Kawai et al. |

OTHER PUBLICATIONS

A. Terada et al., "A Tool for Constructing a Synonym Dictionary", Information Processing Society of Japan, Natural Language Technical Report, pp. 87-94, Nov. 2006.

International Search Report mailed May 21, 2013 in PCT International Application.

FIG. 3
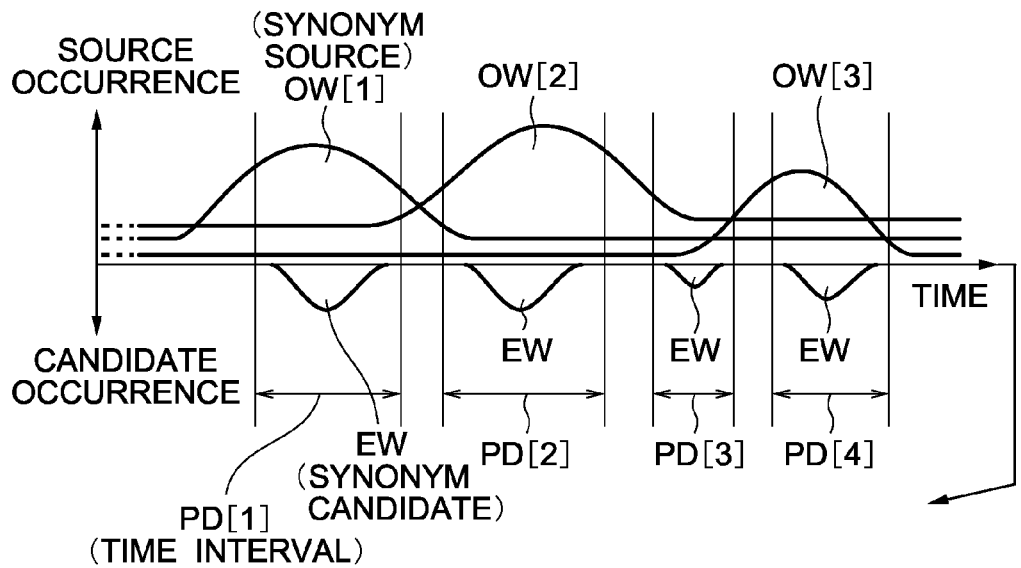
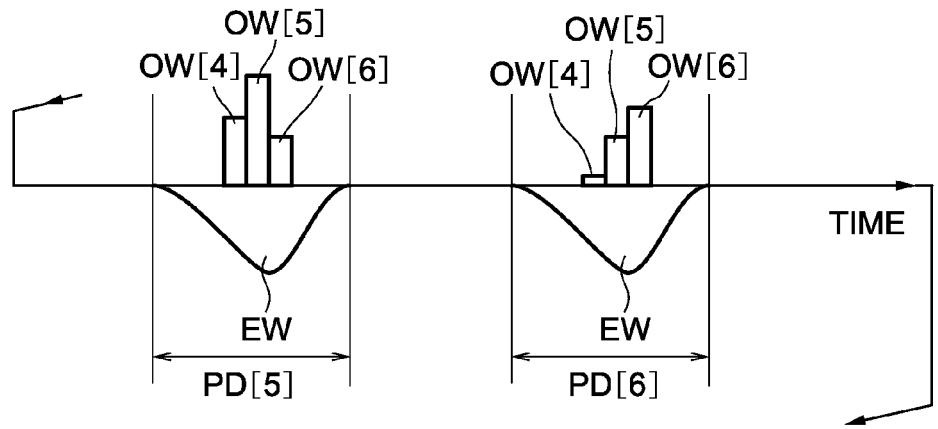
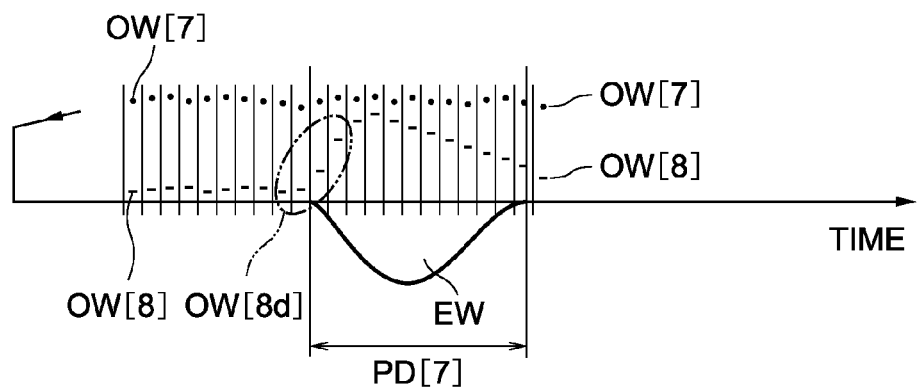

SYNONYM RELATION DETERMINATION DEVICE, SYNONYM RELATION DETERMINATION METHOD, AND PROGRAM THEREOF

CROSS-REFERENCE TO RELATED PATENT APPLICATIONS

This application is a National Stage Entry of International Application No. PCT/JP2013/058696, filed Mar. 26, 2013, which claims priority from Japanese Patent Application No. 2012-082722, filed Mar. 30, 2012. The entire contents of the above-referenced applications are expressly incorporated herein by reference.

TECHNICAL FIELD

The present invention relates to a synonym relation period determination device, a synonym relation period determination method, and a synonym relation period determination program. More specifically, the present invention relates to a synonym relation period determination device, a synonym relation period determination method, and a synonym relation period determination program for determining the period in which a synonym relation is established.

BACKGROUND ART

With information processing targeted on natural word data, it is difficult to automatically acquire the relation between a natural word and a natural word in terms of the meanings in a state of being able to be calculated by a computer. As the relations in terms of the meanings, there are a relation between a higher concept and a lower concept, a synonym relation to be synonyms with each other, and the like. With natural language application, it is particularly important to acquire and use the synonym relation.

In a case of a task such as monitoring rumors on the Internet in particular, it is insufficient to use the formal names of organizations and products as a search courier and to take the matching documents as the monitoring target. It becomes necessary to acquire synonym expressions such as other names for the organizations and products, abbreviated forms, ciphered forms, and jargons thereof and to add those to the search courier to reduce failures in monitoring. For that, various methods have been proposed for automatically acquiring the synonym expressions.

For example, Non-Patent Document 1 proposes a method which, as the synonym expressions, automatically acquires those with similar contexts appeared among the candidates of the synonym expressions. That is, it is tried to automatically judge that there is a synonym relation when words used simultaneously are common based on the commonality of the words appearing in a given text.

Further, Patent Document 1 discloses a method for defining the relevance degree between words based on correlation coefficients of use frequencies of each search word in time series, which is designed to perform automatic creation of a synonym dictionary which corresponds to the fact that the synonym relation changes over time.

Patent Document 2 discloses a method which generates a collation index from a jargon expression list of "*" and the like and extracts the synonym relation by collating those with the original expressions in order to extract the synonym relation between the jargons such as "*bishi Denki", "Bo-A chou" and the original expressions such as "Mitsubishi Denki (Mitsubishi Electric)", "Bouei Chou (the Defense Agency)".

Patent Document 3 discloses a method which uses information regarding broadcast stations and broadcast time and takes the words excluding the name of the series and the titles of each broadcast from the candidates of the synonyms in order to extract the synonym relations between the name of the program and the abbreviation, the informal name, or the like thereof.

Patent Document 1: Japanese Unexamined Patent Publication Hei 11-312168
Patent Document 2: Japanese Unexamined Patent Publication 2003-296354
Patent Document 3: Japanese Unexamined Patent Publication 2006-163710
Non-Patent Document 1: Terada, et., al., "A Tool for Constructing a Synonym Dictionary using Context Information", Information Processing Society of Japan, Natural Language Technical Report 2006 (124), November 2006, pp. 87-94

However, among the synonym expressions, there are cases where abbreviations and ciphered letters are ambiguous and cases where the meanings thereof change over time. Thus, it is difficult with the existing synonym expression acquiring methods to determine synonyms correctly. For example, "To* Denryoku" is considered as a ciphered expression of "Tokyo Denryoku (Tokyo Electric Power Company, Incorporated)". However, this also can be a ciphered expression of "Tohoku Denryoku (Tohoku Electric Power Company, Incorporated)". As in this case, the content indicated by "To* Denryoku" is polysemous, e.g., may indicate "Tokyo Denryoku" or "Tohoku Denryoku".

Further, in practice, the content indicated by "To* Denryoku" can change to "Tokyo Denryoku" or "Tohoku Denryoku". For example, in the case of FIG. 13, "To* Denryoku" indicates "Tokyo Denryoku" at time A and time C while indicating "Tohoku Denryoku" at time B, which is an example where the synonym relation changes over time.

In such case, the existing methods do not take the synonym expression whose content change over time into consideration, so that the synonym relation cannot be determined correctly. The method such as Non-Patent Document 1 which uses the context for determining the synonym relation does not take the fact that the synonym relation changes over time into consideration since it does not use the time information.

Further, in a case where the synonym relation changed over time, the correlation between "To* Denryoku" and "Tokyo Denryoku" or "Tohoku Denryoku" does not become high as shown in FIG. 13 even with the method shown in Patent Document 1 that uses the time series correlation. Thus, it is not possible to determine that there is a synonym relation. That is, in the case of Patent Document 1, the synonymity is also determined on an assumption that the synonymity does not change over time. Therefore, it is not possible to determine the time interval in which the synonymity exists in a case where the synonymity changes over time.

With Non-Patent Document 1 described above, the synonymity can be judged by using the contexts. However, the synonymity that changes depending on the time cannot be grasped since it does not use the time information.

That is, in a case where the synonymity changes over time and a single synonym candidate becomes a synonym with different synonym words over the time, the time series correlation calculated by the method as in Patent Document 1 does not become high. As a result, a synonym relation cannot be extracted.

Further, with the method depicted in Patent Document 2, it is possible to generate a synonym candidate for a synonym word by using words used for ciphers or omissions (○, "cl" that is a combination of "c" and "L" for "d"). However, it is not possible to grasp the changes in the meaning of the synonym candidate over time.

With the method depicted in Patent Document 3, time information is used for determining synonym words. However, the information from a same information source (broadcast station) is taken as the target, so that it cannot be employed for a text set gathered from an unspecified large number of sources.

Further, with the techniques of Non-Patent Document 1, Patent Documents 1 to 3 described above, and combinations thereof, the synonymity between the synonym candidates and the synonym word cannot be determined correctly when the meanings of the synonym candidates change over time.

It is therefore an object of the present invention to provide a synonym relation determination device, a synonym relation determination method, and a program thereof for making it possible to effectively extract and specify the synonym relation of the synonym candidate whose meaning changes over time from natural words used in texts from an unspecified large number of sources.

DISCLOSURE OF THE INVENTION

In order to achieve the foregoing object, the synonym relation determination device according to the present invention includes: a synonym expression candidate storage unit in which a prescribed synonym source expression and a plurality of synonym expression candidates as targets of the synonym relation are recorded in a mutually corresponding manner; and a synonym relation determination/specification module which determines and specifies a synonym relation between the synonym expression candidates and the synonym source expression in texts inputted from outside based on a specific standard.

Further, the synonym relation determination/specification module includes: a text gathering unit which gathers the texts inputted from outside, and generates a text set whose issuing time can be specified; a synonym candidate detection module which specifies and outputs a time interval where the synonym expression candidates are detected many times and a time interval where the synonym source expression is detected many times from the text set gathered by the text gathering unit 14; and a synonym period specification module which determines and specifies a time interval in which the synonym expression candidate and the synonym source expression are in a synonym relation as a synonym period based on a positional relation between the time interval where the synonym expression candidate is detected in the text set and the time interval where the synonym source expression is detected in the text set and based on detection frequency thereof.

In order to achieve the foregoing object, the synonym relation determination method according to the present invention is used for a synonym relation determination device which includes: a synonym expression candidate storage unit in which a prescribed synonym source expression and a plurality of synonym expression candidates as targets of the synonym relation are recorded in a mutually corresponding manner; and a synonym relation determination/specification module which determines and specifies a synonym relation between the synonym expression candidates and the synonym source expression in texts inputted from outside based on a specific standard, wherein:

a text gathering unit of the synonym relation determination/specification module gathers the texts inputted from outside and generates a text set whose issuing time can be specified based thereupon (a text gathering/generating step);

the synonym relation determination/specification unit determines and specifies a synonym relation between the synonym expression candidate and the synonym source expression contained in the generated text set based on a specific standard (a synonym relation determining/specifying step);

in a step for specifying the synonym relation, a synonym candidate detection module of the synonym relation determination/specification unit searches and specifies a time interval where the synonym expression candidates are detected many times and a time interval where the synonym source expression is detected many times from the text set, respectively (a synonym candidate detecting step); and subsequently, a synonym period specification module of the synonym relation determination/specification unit determines and specifies a time interval in which the synonym expression candidate and the synonym source expression are in a synonym relation as a synonym period based on a positional relation between the time interval where the synonym expression candidate is detected in the text set and the time interval where the synonym source expression is detected in the text set and based on detection frequency thereof (synonym period specifying step).

In order to achieve the foregoing object, the synonym relation determination program according to the present invention is used for a synonym relation determination device which includes: a synonym expression candidate storage unit 10 in which a prescribed synonym source expression and a plurality of synonym expression candidates are recorded in a mutually corresponding manner; and a synonym relation determination/specification module which determines and specifies a synonym relation between the synonym expression candidates and the synonym source expression in texts inputted from outside based on a specific standard, and the program includes:

a text gathering/generation processing function which gathers the texts inputted from outside and generates based thereupon a text set whose issuing time can be specified; and a synonym relation specification processing function which executes processing for determining and specifying a synonym relation between the synonym expression candidate and the synonym source expression contained in the generated text set based on a specific standard, wherein:

the synonym relation specification processing function includes a synonym candidate detection processing function which executes processing for searching and specifying a time interval where the synonym expression candidates are detected many times and a time interval where the synonym source expression is detected many times from the text set gathered by the text gathering unit, respectively, and a synonym period specification processing function which determines and specifies a time interval in which the synonym expression candidate and the synonym source expression are in a synonym relation as a synonym period based on a positional relation between the time interval where the synonym expression candidate is detected in the text set and the time interval where the synonym source expression is detected in the text set and based on detection frequency thereof; and the program causes a computer provided to the synonym relation determination/specification module to execute each of the processing functions.

As described above, the present invention is structured to determine the synonymity by capturing the point at which the synonym expression candidates appeared many times, so that the start time at which the synonym relation is established can be outputted. Therefore, it becomes possible to provide the excellent synonym relation determination device, synonym relation determination method, and program thereof, which are not in the related techniques described above and capable of determining the time interval where the synonym relation is established when the synonymity changes over time.

BRIEF DESCRIPTION OF THE DRAWINGS

FIG. 3 is an explanatory chart showing examples of time transition regarding occurrence of a synonym-target word used in FIG. 1 and time transition regarding occurrence of synonym candidates;

BEST MODES FOR CARRYING OUT THE INVENTION

Figure 1:
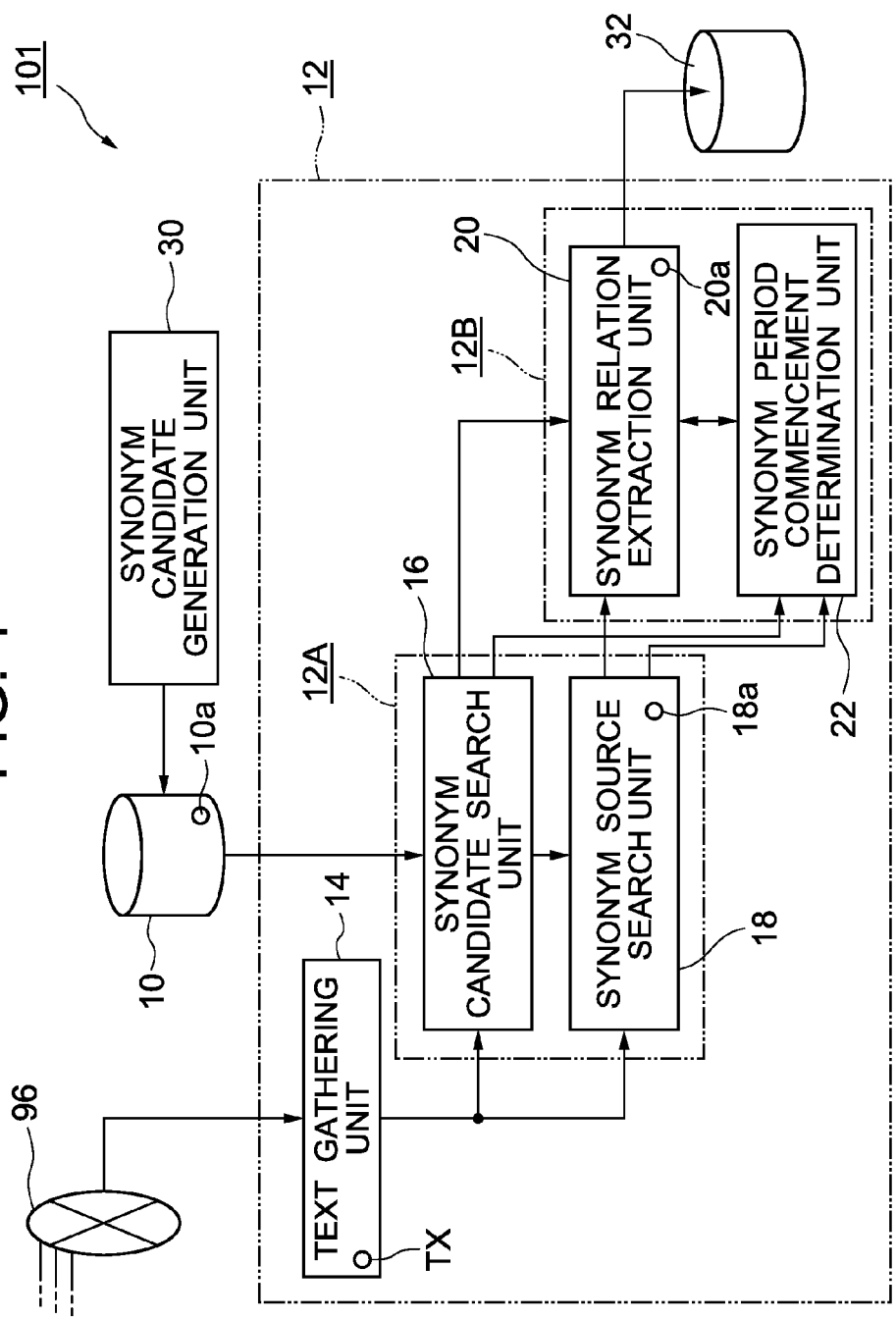
FIG. 1 is a block diagram showing a first embodiment of a synonym relation determination device according to the present invention.

A first embodiment of the present invention will be described hereinafter by referring to FIG. 1 to FIG. 8.

First, the concept of a synonym relation will be clarified and the basic structural content of the first embodiment will be described. Thereafter, the first embodiment will be described in more details.

(Concept of Synonym Relation)

First, in the first embodiment, a synonym relation of two words (natural word phrases) is determined by corresponding to the period.

Note here that the synonym relation is an expression regarding a synonym source as a seed expression and a synonym candidate possible to have the synonymity with the synonym source. For example, natural word phrases "Nippon Denki (NEC Corporation)", "NEC", and "Nichiden" have the synonymity as the words. Further, assuming that "Nippon Denki" is the synonym source as the seed expression, "NEC" and "Nichiden" are synonym candidates.

Further, in the first embodiment, the synonym relation that changes over time is extracted. As the synonym relation that changes over time, there are a case where the synonym expression candidate is polysemous so that it can be a candidate for a plurality of synonym sources, a case where the meaning changes because the interest and relationship for the synonym source changes over time, and the like. For example, "Asahi" is polysemous and takes different company names such as newspaper, life insurance, beverages, and the like as the synonym sources. Further, in texts (writings) transmitted from an unspecified large number of sources mainly via the Internet, there is a possibility of having such a tendency that "Asahi" often means newspaper in the morning while it often means beverages at night.

As an example of the case where the meaning changes because the interest and relationship for the synonym source changes over time, there is a case of changes over time where the name of the actor of the main cast who grows up in a program builds up and loses a synonym relation with the words such as "boy", "young man", "boyfriend", "husband", "father", "grandfather", and the like. In that case, the synonym relation changes every several months provided that it is a serial program of one year.

Further, there is also a case where a synonym relation is established when a term used in an ordinary dictionary acquires another meaning as a vogue word. For example, synonym relations regarding "supporter", "Tama-chan", "maizoukin", "shiwake", "Nadeshiko", and the like change before and after the words start to be in vogue. When a vogue word acquires a special meaning and then loses that special meaning, the synonym relation changes again. Such change occurs in a unit or several years or several tens of years.

Expressions (to be synonym expression candidates) using ciphers and omissions tend to be polysemous, and the synonym relations thereof also tend to change. When a name of a company is expressed with a letter of the alphabet or when a person is expressed with initials of several letters of the alphabet, there are generated a plurality of synonym sources that can establish a synonym relation. For example, when "NEC" is expressed with an omission such as "NE-", it can also be interpreted as "NET", "NEW", "NEO", and the like.

When the name of a company is expressed with the alphabet, there may be cases where electronic communications are done with omissions in relation to some kinds of news. In such case, the expressions with omissions appear in the period where the number of occurrence of the synonym source increases because it has become news and establishes the synonymity. Such synonymity generated by news may end in several hours in some cases.

(Basic Content)

As shown in FIG. 1, a synonym relation determination device 101 of the first embodiment includes: a synonym expression candidate storage unit 10 in which a prescribed single synonym source expression and a plurality of synonym expression candidates as the targets of the synonym relation are recorded in a mutually corresponded manner; and a synonym relation determination/specification module 12 which determines and specifies the synonym relation between the synonym expression candidate in texts inputted from outside and the synonym source expression based on a specific standard.

Further, the synonym expression candidate storage unit 10 is also provided with a synonym candidate generation unit 10A which inputs a seed for generating a synonym expression candidate and generates a synonym candidate from the seed expression.

Further, the synonym relation determination/specification module 12 includes: a text gathering unit 14 which gathers the texts inputted from outside and generates a text set whose issuing time can be specified based thereupon; a synonym candidate detection unit 12A which specifies and outputs a time interval where the above-described synonym expression candidates are detected many times and a time interval where the synonym source expression are extracted many times from the text set gathered by the text gathering unit 14; and a synonym period specification unit 12B which determines and specifies the period where the synonym expression candidates and the synonym source expression are in a synonym relation as a synonym period based on the positional relation between the time interval where the synonym expression candidates are detected in the text set and the time interval where the synonym source expression is detected in the text set, and the detected frequency thereof.

Therefore, while the details will be described later, the basic structure is designed to determine the synonymity by capturing the point at which the synonym expression candidates appeared many times, so that the start time at which the synonym relation is established can be outputted. Thus, it becomes possible to determine the time interval where the synonym relation is established when the synonymity changes over time.

Note here that the synonym candidate detection unit 12A includes: a synonym candidate search unit 16 which detects and counts the synonym expression candidates from the text set whose issuing time collected by the text gathering unit can be specified and specifies the time interval where the occurrence number per unit time is large (as the time interval where the synonym expression candidates exist); and a synonym source search unit 18 which detects and counts the synonym source expressions from the text set whose issuing time gathered by the text gathering unit can be specified and specifies the time interval where the occurrence number per unit time is large (as the time interval where the synonym source expressions exists).

Further, the synonym period specification unit 12B includes: a synonym relation extraction unit 20 which at least extracts the synonym source expression whose occurrence number is the largest in the text set in the time interval where the synonym expression candidates are detected by the synonym candidate detection module as the synonym source that is in a synonym relation; and a synonym period commencement determination unit 22 which determines that the extracted synonym source expression is in a synonym relation with the synonym expression candidate, defines the start point of the time interval where the both are in the synonym relation as the start point of the synonym period, and registers it along with the synonym period to a synonym dictionary 32 provided in advance.

The synonym period commencement determination unit 22 also includes a function which determines the synonym source expression whose occurrence number ratio per unit time before the time interval with respect to the occurrence number per unit time in the time interval is the largest among the set in the time interval where the synonym expression candidates are detected in the text set to be in the synonym relation with the synonym expression candidate.

Further, the synonym period specification unit 12B includes a synonym period end determination unit 24 which determines that the synonym relation is cancelled at the point where the occurrence number per unit period of the synonym expression candidate determined and specified as being in the synonym relation by the synonym period commencement determination unit 22 of the synonym period specification unit 12B becomes equal to or smaller than a threshold value set in advance.

Note here that the above-described synonym candidate generation unit 10A includes a function which takes an expression to be a seed (referred to as a "seed expression" hereinafter) for generating the synonym expression candidate as an input as described above, and generates a synonym expression candidate from the seed expression. In this case, a plurality of synonym expression candidates are generated by employing operations such as generating an abbreviation by extracting a partial character string for the seed expression, generating a cipher by replacing a part of the seed expression with a specific letter, generating a translated expression that is the seed expression translated into another language, etc., for a plurality of times.

Further, the synonym expression candidate storage unit 10 records the synonym expression candidates generated by the synonym candidate generation unit 10A. The synonym expression candidates are used as the index, and one or more pieces of corresponding seed expression referred to as "synonym source expressions" hereinafter) is recorded. Note here that the synonym expression candidate for which a plurality of synonym source expressions are recorded is an ambiguous synonym expression candidate.

The synonym candidate detection unit 12A includes a function which reads the text set whose issuing time can be specified and counts the occurrence number of the synonym expression candidates and the synonym source expressions recorded in the synonym expression candidate storage unit 10 at each point. Further, the time interval where the number of occurrence of the synonym expression candidate per unit period increases greatly is detected.

Furthermore, the synonym period determination module 12B specifies the synonym source expression that is in a synonym relation with the synonym expression candidate by using the text set in the time interval detected by the synonym candidate detection unit 12A, and registers the period where those are in the synonym relation to the synonym dictionary 32.

Further, the synonym period commencement determination unit 22 that forms a part of the synonym period determination module 12B determines which of the corresponding synonym expression the synonym expression candidate detected by the synonym candidate detection unit 12A is in a synonym relation with and, when determined as being in a synonym relation, registers the start point of the time interval detected by the synonym candidate detection unit 12A to the synonym dictionary 32 as the start point of the synonym relation.

The synonym relation is determined by determining that the synonym source expression whose occurrence number is the largest among the text set in the time interval where the synonym expression candidates are detected or the synonym source expression having the largest ratio regarding the occurrence number per unit time before the time interval with respect to the occurrence number per unit time in the time interval is in a synonym relation with the synonym expression candidate.

A synonym dictionary 5 is a dictionary which records the expressions in a synonym relation, which can also record the start and end time of the synonym relation as well.

As described above, in the first embodiment, the synonym relation determination device 101 includes the synonym relation expression candidate storage unit 10 and the synonym relation determination/specification module 12. Further, the synonym relation determination/specification module 12 includes the text gathering unit 14, the synonym candidate search unit 16, the synonym source search unit 18, the synonym relation extraction unit 20, and the synonym period commencement determination unit 22. Furthermore, the synonym relation determination device 101 includes the synonym candidate generation unit 30 and the synonym dictionary 32.

With such structures, the time interval PD where the synonym relation is established is to be determined As described above, the synonym candidate detection unit 12A is constituted with the synonym candidate search unit 16 and the synonym source search unit 18, and the synonym period determination module 12B is constituted with the synonym relation extraction unit 20 and the synonym period commencement determination unit 22.

Figure 2:
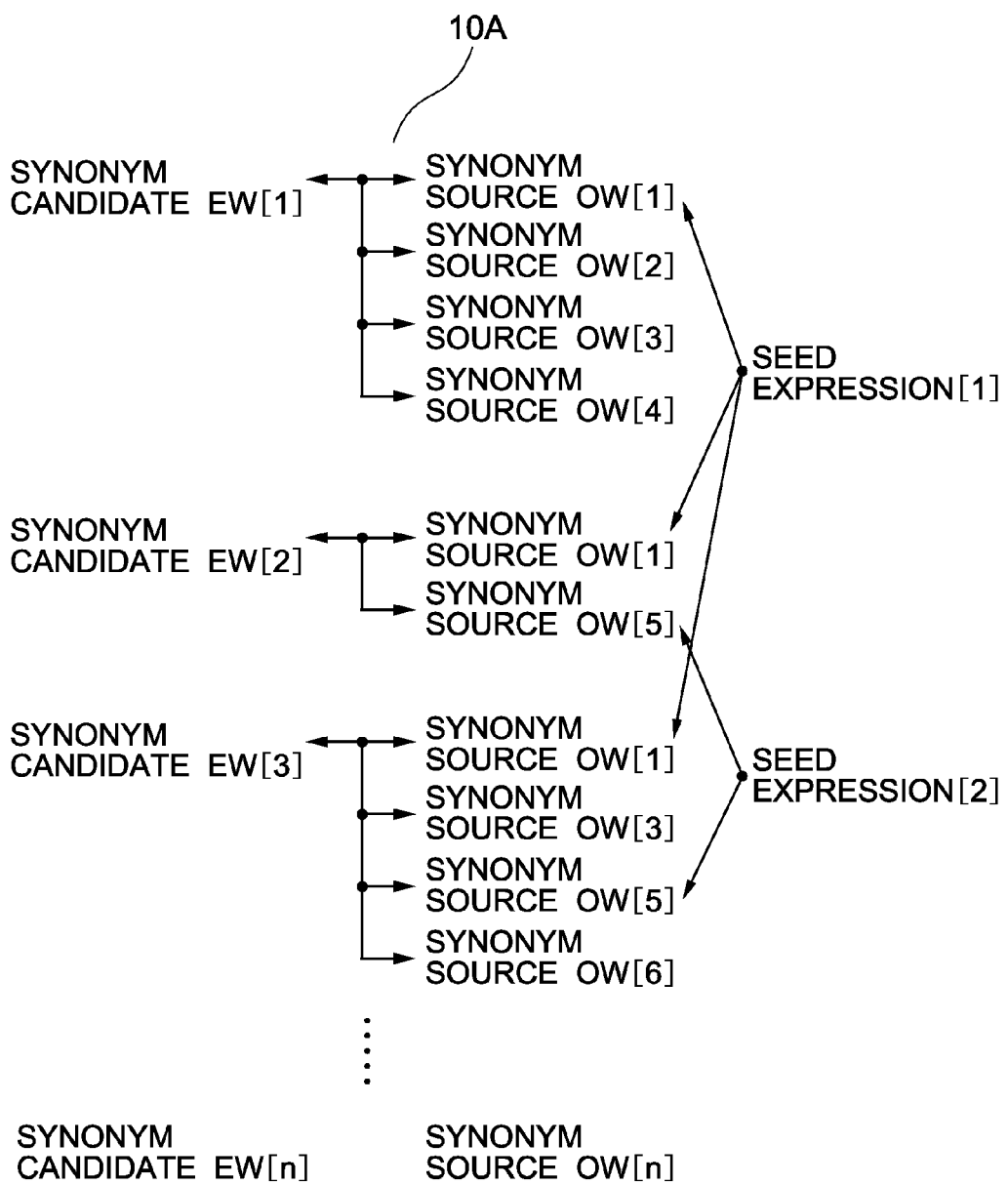
FIG. 2 is an explanatory chart showing an example of a synonym candidate list used in FIG. 1.

The synonym expression candidate storage unit 10 records in advance a synonym candidate EW that is a synonym candidate for a word that is a synonym source OW by associating it with the synonym source OW. The synonym expression candidate storage unit 10 uses the synonym candidate EW as an index, and stores one corresponding seed expression (synonym source OW) or more in an associated manner. The synonym candidate list 10A shown in FIG. 2 is data in which the synonym candidates EW and the synonym sources OW are associated in the manner described above. The synonym candidate list 10A only needs to be created immediately before collecting the data. The synonym candidates EW may be automatically created by using the texts gathered in the past or the synonym candidates EW examined by the user artificially may be inputted.

In a case of automatic creation, the synonym expression candidate storage unit 10 stores the synonym candidates EW generated automatically by the synonym candidate generation unit 30 by including those to the synonym candidate list 10A. Note here that the synonym candidate EW for which a plurality of synonym sources OW are stored is an ambiguous synonym candidate EW.

The synonym relation determination/specification module 12 gathers the texts containing natural word data that can be information-processed via a network 96, for example, and performs data processing on the set of the texts (see FIG. 1). This network 96 is the Internet, for example, and it may be a local network 96 connected to the Internet.

The natural word data is texts containing words, sentences, paragraphs, and the like in a language such as Japanese, English, or the like, and it is information read out by human beings. The text is data containing the natural word data, and the file format may be of any types as long as the natural words can be expressed therewith. Further, the amount and the extent of proofreading thereof are not specifically limited, e.g., a comment of one line, a document, a thesis, and those organized as a book.

This text is preferable to contain the logical location related to the author of the article and the issuing time as attribute information. As examples of the logical location, there are an IP address and an URL that also shows the file location and a retrieval result of a database in a server group (Web site) that can be specified by the IP address or the like.

The text gathering unit 14 generates a text set TX through gathering the texts by associating those with the issuing time thereof. The text gathering unit 14 handles the text having the issuing time (e.g., writing time) as the attribute information to have been issued at that issuing time. When a text whose issuing time is unknown is gathered anew, the gathered time (e.g., crawl time) can be considered as the issuing time of that text.

The texts may be gathered by robot search done for an unspecified large number of server devices 70 connected to the Internet or data acquired by accessing to a designated address by the user in advance may be collected. When gathering the texts from the server devices, not only the character data but also an entire file including images and links may be received. It is also possible to receive only differences with respect to already gathered data.

The text set TX is a set of text data containing a vast amount of articles, and it may be stored in a storage medium such as the synonym expression candidate storage unit 10 or the like by taking the issuing time or the period to which the issuing time belongs as a key. Further, not only the text but also indexes for the synonym source OW and the synonym candidate EW in the synonym candidate list 10A may be generated and stored in a united manner.

The synonym candidate search unit 16 calculates a time interval PD searched in the text set TX where the synonym candidate EW contained in the text set TX is searched from the issuing time of the text.

The time interval PD is a period sectioned by the start time. In the first embodiment, it is a period where the synonym candidate EW is searched. When the synonym candidate EW is started to be searched from the collected text set TX, there is a start time of the time interval PD but there is no end time since the search is in progress.

More than a specific number of the synonym candidates EW are contained in the text set TX in the time interval PD, and not more than the specific number of the synonym candidates EX are contained in the text set TX before the time interval PD. The specific number may be "0" or may be set as the number of searches under an ordinary state (normal state).

The synonym candidate search unit 16 reads the text set TX whose issuing time can be specified, and counts how many times the synonym candidates EW stored in the synonym expression candidate storage unit 10 appear at each point. Further, the period where the synonym candidate EW is searched in the text set TX is defined as the time interval PD. For example, a period where the occurrence number of the synonym candidate EW per unit period increases greatly is defined as the time interval PD of that synonym candidate EW.

The synonym search unit 18 calculates the occurrence of the synonym source OW through searching for the synonym source OW stored in the synonym expression candidate storage unit 10 from the text set TX in the period that overlaps with the time interval PD where the synonym candidate EW is searched. "Occurrence" is a data item acquired as a result of search, and it is the occurrence number or occurrence ratio, for example.

The period that overlaps with the time interval PD may be a completely same period as the time interval PD or may be set as the period before a specific time from the time interval PD. The overlapping period may be partially overlapped with the time interval literally.

The synonym source search unit 18 searches for the synonym source OW that is possible to be in a synonym relation with the synonym candidate EW having the time interval PD from the text set TX in the period that overlaps with the time interval PD. Thereby, it is possible to acquire the data regarding how the synonym candidate EW appeared in the period that overlaps with the time interval PD where the synonym candidate EW appeared (including the same period). The time interval PD for the synonym source OW may also be calculated.

As the information processing, the synonym source search unit 18 searches for the synonym source OW at a search designated time or every unit time defined in advance separately from the time interval PD, and may further calculate the occurrence number in the text set TX in the period that overlaps with the time interval PD.

In any cases, the synonym source search unit 18 counts how many times the synonym source OW appears at each point.

Further, when there is an occurrence of the synonym source OW in the time interval PD where the synonym candidate EW is searched, the synonym relation extraction unit 20 extracts a synonym relation between the synonym candidate EW and the synonym source OW. For example, the synonym relation between the synonym source OW appearing in the period same as the time interval PD and the synonym candidate EW is extracted.

Further, it is also possible to extract the fact that there is a synonym relation with the synonym source OW whose occurrence is increased in the time interval PD with respect to the occurrence thereof in the period before the time interval PD. In a case of calculating the time interval PD of the synonym source OW, the synonym relation extraction unit 20 can determine that the synonym source OW appeared in the time interval PD of the synonym candidate EW when the time interval PD of the synonym candidate EW and the time interval PD of the synonym source OW overlaps with each other.

As described, the synonym relation extraction unit 20 specifies the synonym source OW that is in the synonym relation with the synonym candidate EW by using the text set TX in the time interval PD detected by the synonym candidate search unit 16 and the synonym source search unit 18. When it is connected to the synonym dictionary 32 shown in FIG. 1, the synonym relation specified in the time interval PD is registered to the synonym dictionary 32.

In the case shown in FIG. 1, through searching the synonym source appeared in the text set TX in the period that overlaps with the time interval PD where the synonym candidate EW is searched, the synonym relation between the synonym candidate EW and the synonym source OW can be automatically extracted by information processing while sectioning it at the time interval PD.

Such synonym relation established in the time interval PD where the synonym candidate EW is searched is called "time interval synonym". As described above, there are various periods where the time interval synonym can be established.

When it is originated from news or the like, the period may end in several hours. In the meantime, in cases of vogue words or new concepts, the relation can be established for several tens of years. Further, depending on the synonym relation, the relation may not be ended at the point of gathering the text TX after the start of the time interval synonym.

The synonym candidate generation unit 30 takes a seed expression to be a seed for generating the synonym candidate EW as an input, and automatically generates the synonym candidate EW from the seed expression. The synonym candidate generation unit 30 automatically generates a plurality of synonym candidates EW through employing following operations on the expression of the synonym source OW for a plurality of times.

(1) A partial character string for a seed expression is extracted to generate an abbreviation. (2) A part of the seed expression is replaced with a specific character to generate a cipher. (3) A translated expression acquired by translating the seed expression into another language is generated.

The synonym dictionary 32 is a dictionary which stores the expression in a synonym relation, to which the start as well as the end time of the synonym relation can be registered along. The synonym relations stored in the synonym dictionary 32 can be used in various usages such as searching by using thesaurus, classifying text data into classes, grouping, natural word analysis, data mining, trend analysis, and rumor/reputation surveys.

Hereinafter, this will be described in more details.

The synonym candidate list 10A shown in FIG. 2 contains cases where the synonym candidate EW is polysemous. For a synonym candidate EW[1], synonym sources OW[1] to [4] are registered as the candidates for the synonym relation. When the synonym candidate EW[1] is a word among east, west, south, and north (e.g., east), a great number of synonym sources OW such as names of companies, names of countries, and the like are possible.

On the synonym candidate list 10A, there are the synonym candidates EW[1] to [n] and the synonym sources OW[1] to [n]. The synonym source OW[1] as the same seed expression [1] may be associated with a plurality of synonym candidates EW[1], [2], and [3].

Note here that when the synonym expression candidate storage unit 10 stores the polysemous synonym candidate EW to be the synonym word candidate for a plurality of synonym sources OW, it is preferable for the synonym source search unit 18 to include plural occurrence processing 18a and for the synonym relation extraction unit 20 to include selection processing 20a (see FIG. 1).

In FIG. 1, the plural occurrence processing 18a calculates the occurrence of the synonym source OW for each synonym source OW that is in a synonym relation with the polysemous synonym candidate EW. Then, the selection processing 20a compares the occurrence of a plurality of synonym sources OW in the period that overlaps with the time interval PD of the polysemous synonym candidate EW to select the synonym source OW that is in a synonym relation with the polysemous synonym candidate EW.

For example, it is assumed that a plurality of synonym sources OW[1], [5] appeared in the time interval PD of the synonym candidate EW[2] shown in FIG. 2. The plural occurrence processing 18a calculates the occurrence of the synonym source OW[1] and the occurrence of the synonym source OW[5] in the time interval PD. Then, the selection processing 20a compares the occurrence of the synonym source OW[1] and the occurrence of the synonym source OW[5], and selects the synonym source OW[5] that is in a synonym relation.

For selection made by comparison, there are selection of the synonym source OW whose occurrence number or occurrence ratio is high, selection made by eliminating the synonym sources OW whose occurrence number and the occurrence ratio are low from the candidates, etc. The selection processing 20a may select the only synonym source OW or may select a plurality of synonym sources OW.

As described, when a plurality of synonym sources OW are searched in the time interval PD of the polysemous synonym candidate EW, the synonym source OW suited for each time interval can be specified through extracting the synonym relation by comparing the occurrence with the synonym relation extraction unit 20. Further, the synonym relation extraction unit 20 may be structured to establish the synonym relation with the synonym source OW which individually satisfies a specific condition without comparing the occurrence.

FIG. 3 shows the time transition of the occurrence of the synonym candidate EW and the occurrence of the synonym sources OW[1] to [8] which are possible to be in a synonym relation with the synonym candidate EW. The occurrence number of the synonym source OW increases upwardly in the chart, while the occurrence number of the synonym candidate EW increases downwardly in the chart. The time interval PD is the period where the synonym candidate EW is searched. In the case shown in FIG. 3, the time intervals from PD[1] to [6] include the end point of the synonym relation, and the time interval PD[7] is not ended.

Occurrences are Common: from Time Interval PD[1] to Time Interval PD[4]

The synonym relation extraction unit 20 can extract a synonym relation when the occurrences of the synonym candidate EW and the synonym source OW are common in terms of time. Note here that the time interval PD of the synonym source OW overlaps with the time interval PD of the synonym candidate EW, the occurrences are common in terms of time.

For example, the synonym source OW[1] appears in the time interval PD[1] of the synonym candidate EW, so that the synonym relation extraction unit 20 determines that a relation is established between the synonym candidate EW and the synonym source OW[1] in the time interval PD[1]. Similarly, the synonym relation extraction unit 20 can determine that synonym candidate EW establishes synonym relations with the synonym source OW[2] in the time interval PD[2], and with the synonym source OW[3] in the time interval PD[4].

Regarding the time interval PD[3], no synonym source OW of common occurrence is specified in the time interval PD[3]. However, when the period before the time interval PD[3] is included as the period overlapping with the time interval PD[3], a synonym relation with the synonym source OW[2] can be extracted. Further, when the occurrence changing ratio is used, the synonym relation extraction unit 20 can also extract the synonym relation with the synonym source OW[3] since the occurrence of the synonym source OW[3] is increased rapidly in the time interval PD[3].

(Case of Time Interval PD[5] and Time Interval PD[6] having Largest Occurrences)

When a plurality of synonym sources OW exist in the time interval PD, the synonym relation extraction unit 20 can determine that a synonym relation is established with the synonym source OW whose occurrence number is the largest.

Note here that the occurrence number of the synonym source OW in the time interval PD[5] and the time interval PD[6] is a value acquired by adding the occurrence numbers in the time intervals PD through searching the synonym source OW by the synonym source search unit 18 from the text set TX specified in each of the time intervals PD.

Further, the synonym relation extraction unit 20 selects the synonym source OW[5] whose occurrence is the largest in the time interval PD[5] as shown in a column graph, and establishes a synonym relation with the synonym candidate EW. Further, when a plurality of synonym relations are allowed for the same time interval PD, the synonym source OW[4] whose occurrence number is smaller than a condition set in advance may be eliminated and synonym relations with the synonym sources OW[5] and [6] may be established in the case shown in the time interval PD[6].

(Case of Time Interval PD[7] where Occurrence Changing Ratio is High)

The synonym relation extraction unit 20 can also extract the synonym relation based on a calculation value acquired by using the occurrence number per unit time. Through taking the occurrence number per unit time, it is possible to use the changing ratio of the occurrence number of the same, the ratio of the occurrence numbers between the different origins OW, and the like.

For example, FIG. 3 shows the change over time in the occurrence numbers per unit time regarding the synonym source OW[7] and the synonym source OW[8] in the relation with respect to the time interval PD[7]. The time between short vertical lines in parallel to the vertical line showing the time interval PD[7] in the chart is the unit time.

The synonym source search unit 18 searches for the synonym source OW from the text set TX for each unit time, and calculates the occurrence number. In the time interval PD[7], the occurrence number of the synonym source OW[7] is large. Thus, the synonym source OW[7] is selected when the occurrence number (total number) of the time interval PD[7] unit or the occurrence number per unit time is compared with the synonym source OW[8].

In the meantime, the changing ratio OW[8d] of the synonym source OW[8] is increased in the period overlapping with the time interval PD[7], while the changing ratio of the synonym source OW[7] is small. The synonym relation extraction unit 20 can extract the synonym relation not with the synonym source OW[7] of the largest number but the synonym source OW[8] whose number of use is increased rapidly based on the changing ratio of the occurrence number of the synonym source OW in the period overlapping with the time interval PD[7].

The synonym relation extraction unit 20 may determine the synonym relation between the synonym candidate EW and the synonym source OW based on the commonness (overlapping or the like) of the time interval PD of the synonym candidate EW and the time interval PD of the synonym source OW.

First, the synonym candidate EW as the candidate for the expression to be in a synonym relation with the synonym source OW is recorded in the synonym expression candidate storage unit 10 along with the synonym source OW.

Then, the synonym candidate search unit 16 calculates the time interval PD where the synonym candidate EW is detected in the text set TX by referring to the text set TX whose issuing time can be specified. Further, the synonym source search unit 18 calculates the time interval PD where the synonym source OW is detected in the text set TX.

In this case, the synonym relation extraction unit 20 determines the time interval PD where the synonym candidate EW is in a synonym relation with the synonym source OW based on the relation between the time interval PD where the synonym candidate EW is detected in the text set TX and the time interval PD where the synonym source OW is detected in the text set TX.

(Explanations of Operations of First Embodiment)

Next, operations of the first embodiment will be described by referring to FIG. 4.

Figure 4:
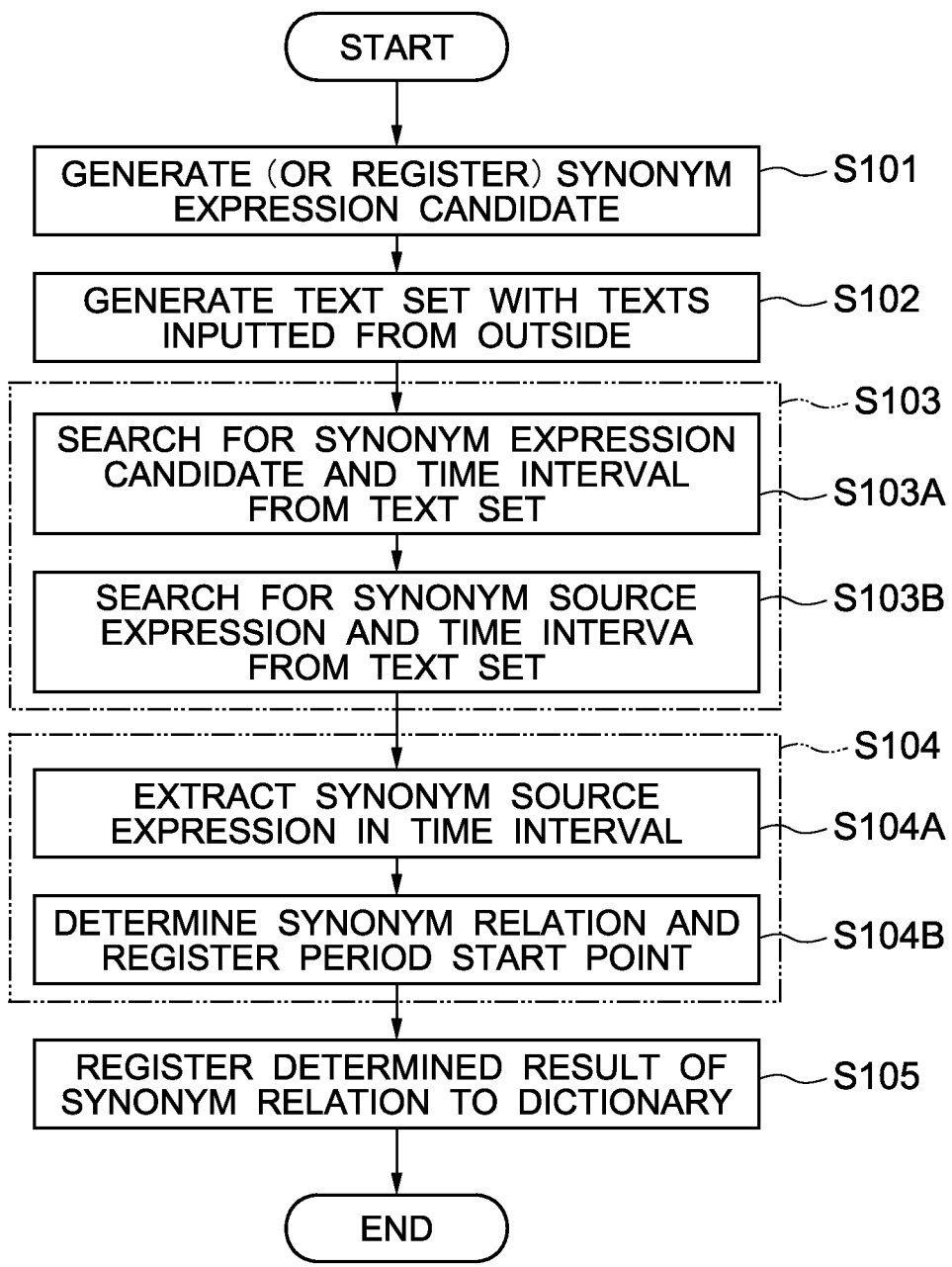
FIG. 4 is a flowchart showing overall operations of the first embodiment disclosed in FIG. 1.

First, the synonym candidate generation unit 30 generates the synonym candidate EW from the seed expression as described above, and stores it to the synonym expression candidate storage unit 10 (FIG. 4: step S101/a synonym candidate generating/registering step). In this case, when a synonym candidate EW generated by the user is inputted, the synonym candidate generation unit 30 may be structured to accept and store it to the synonym expression candidate storage unit 10.

Then, the text gathering unit 14 gathers texts inputted from outside, and generates a text set whose issuing time can be specified based thereupon (FIG. 4: step S102/a text set generating step).

Then, the synonym relation determination/specification module 12 determines and specifies the synonym relation between the synonym expression candidate and the synonym source expression contained in the generated text set based on a specific standard (FIG. 4: steps S103, S104/a synonym relation specifying step).

In the steps for specifying the synonym relation (FIG. 4: steps S103, S104), first, the synonym candidate detection unit 12A of the synonym relation determination/specification module 12 searches and specifies the time interval where the synonym expression candidate is detected many times from the generated text set and the time interval where the synonym source expression is detected many times, respectively (FIG. 4: step S103/a synonym candidate detecting step).

Subsequently, the synonym period specification unit 12B of the synonym relation determination/specification module 12 determines and specifies the time interval where the synonym expression candidate and the synonym source expression are in a synonym relation as the synonym period based on the positional relation between the time interval where the synonym expression candidate is detected in the text set and the time interval where the synonym source expression is detected in the text set and the detection frequency thereof (FIG. 4: step S104/a synonym period specifying step).

In the above-described step for detecting the synonym candidate (FIG. 4: step S103), first, the synonym candidate search unit 16 of the synonym candidate detection unit 12A functions to detect and count the synonym expression candidate from the text set TX gathered by the text gathering unit 14, and to extract and specify the time interval PD where the occurrence number per unit time is large (FIG. 4: step S103A/a synonym candidate correspondence/time interval specifying step).

Specifically, the synonym candidate search unit 16 reads the text set TX, and detects the time interval PD where the occurrence number of the synonym expression candidate EW stored in the synonym expression candidate storage unit 10 per unit period is increased greatly, for example.

Further, at about the same time, the synonym source search unit 18 of the synonym candidate detection unit 12A functions to detect the synonym source expression OW from the text set gathered by the text gathering unit, counts the occurrence number, and extracts and specifies the time interval where the occurrence number per unit time is large (FIG. 4: step S103B/a synonym source correspondence/time interval specifying step).

Further, in the above-described step for detecting the synonym period (FIG. 4: step S104), first, the synonym relation extraction/determination unit 20 of the synonym period specification module 12B functions to extract the synonym source expression whose occurrence number is the largest in the text set in the time interval where the synonym expression candidate is detected in the synonym candidate detecting step (FIG. 4: step S103) as the synonym source in a synonym relation (FIG. 4: step S104A/a synonym relation extracting step).

That is, the synonym relation extraction unit 20 determines which of the synonym source OW the synonym candidate EW detected by the synonym candidate search unit 16 is in a synonym relation, and extracts the synonym relation in the time interval PD.

Further, at about the same time, the synonym period commencement determination unit 22 of the synonym period specification module 12B functions to determine that the extracted synonym expression is in a synonym relation with the synonym expression candidate, defines at the same time the start point of the time interval where the both are in the synonym relation as the start point of the synonym period, and registers it to the synonym dictionary provided in advance along with the synonym period (FIG. 4: step S104B/a synonym period registering step).

Then, at last, the synonym period commencement determination unit 22 of the synonym period specification module 12B functions to store the determination result indicating that those are in the synonym relation as described above to the synonym dictionary 32 (FIG. 4: step S105/a synonym relation registering step). Thereby, the processing is ended.

As described above, in the first embodiment, the synonymity is determined by using the occurrence (the occurrence number, the occurrence changing ratio, the occurrence ratio, and the like) in the time interval PD (or at the point) where the synonym candidate EW appeared, and the time interval PD where the synonym relation is established is calculated. By specifying the time interval PD where the synonym relation is established, the "time interval synonym" is determined regarding the polysemous and ambiguous word. Thereby, it becomes possible to handle the synonym relation sectioned by the time interval PD even when the synonymity changes depending on the time.

That is, in the first embodiment, the synonymity is determined by using the occurrence number per unit period at the point where the synonym expression candidate appeared. Thus, it is possible to output the start time at which the synonym relation is established. Therefore, the time interval where the synonym relation is established can be determined when the synonymity changes depending on the time.

(Regarding Commencement of Synonym Period)

Next, a method for determining the start point of the synonym relation between the synonym candidate EW and the synonym source OW will be disclosed.

In this case, as shown in FIG. 1, the synonym relation determination/specification module 12 includes the synonym period commencement determination unit 22.

This synonym period commencement determination unit 22 determines that the synonym period where a synonym relation with the synonym source OW is established is started at the point where the occurrence of the synonym source OW in the text set TX satisfies a condition set in advance in the time interval PD where the synonym candidate EW is searched in the text set TX that is in the order of the issuing time.

As the condition set in advance, various data, comparison processing, and determination processing can be employed as disclosed by referring to FIG. 3 and the like. As the data regarding occurrence, the occurrence number, the occurrence changing ratio, the occurrence ratio, and the like can be used.

Regarding the comparison and the determination, there are a comparison with a threshold value set in advance, a comparison with a threshold value acquired by a comparison with the occurrence of the synonym source under an ordinary state, a comparison with a value acquired according to a relation with the value of occurrence of another synonym source, and the like. It may be determined as satisfying the condition as a result of comparing the data. Alternatively, an exceptional matter or the like may be defined depending on a specific example of the embodiment, and it may be determined as not satisfying the condition when judged to correspond to the exceptional matter even when determined to exceed the threshold value, for example.

When the synonym period commencement determination unit 22 determines which of the corresponding synonym sources OW the synonym candidate EW detected by the synonym candidate search unit 16 is in a synonym relation and, when determined as being in a synonym relation, for example, the synonym period commencement determination unit 22 may register the start point of the time interval PD detected by the synonym candidate search unit 16 to the synonym dictionary 32 as the start point of the synonym relation.

In this case, the meaning of the synonym candidate EW can be considered as being different before and after the start point.

In the case shown in FIG. 1, the synonym relation extraction unit 20 and the synonym period commencement determination unit 22 are written as different units. However, the synonym relation extraction unit 20 may be structured to include the synonym period commencement determination unit 22.

For making determination based on the occurrence number, the synonym period commencement determination unit 22 first determines that the synonym source OW whose occurrence number is the largest in the text set TX in the time interval PD where the synonym candidate EW is detected in the text set TX is in a synonym relation with the synonym candidate EW. Further, the synonym period commencement determination unit 22 determines that the start point of the time interval PD as the start point of the synonym relation between the synonym candidate EW and the synonym source OW.

Figure 5:
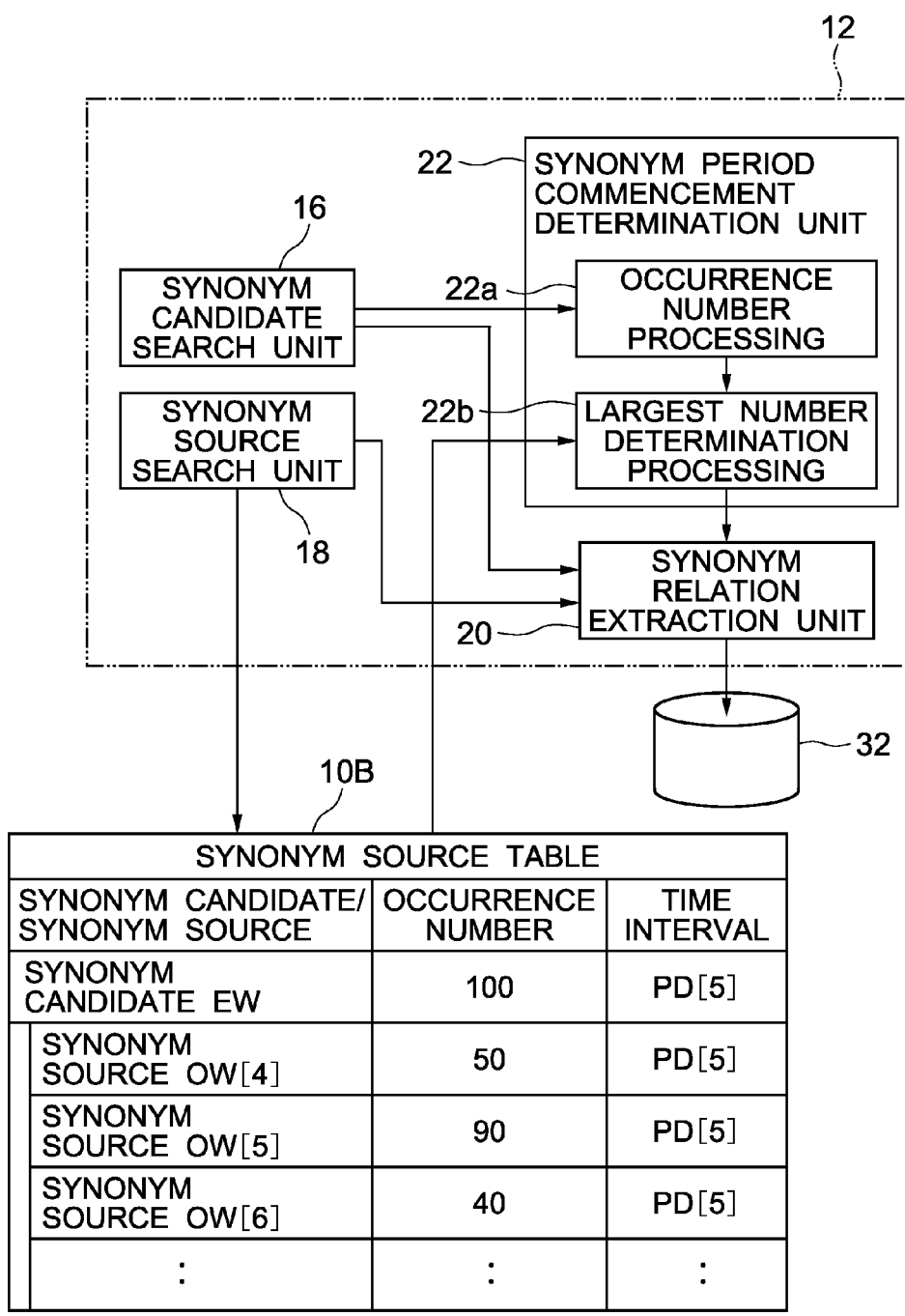
FIG. 5 is a block diagram showing a structural example of a synonym period commencement determination unit of the first embodiment disclosed in FIG. 1.

FIG. 5 shows a structural example of determination processing with the largest occurrence number. In this case, the synonym period commencement determination unit 22 includes the occurrence number processing 22*a* and the largest number determination processing 22*b* for making determination with the largest occurrence number. The occurrence number processing 22*a* calculates the occurrence number of a plurality of synonym sources OW associated with the synonym candidate EW in the time interval PD where the synonym candidate EW is searched in the text set TX. Further, the largest number determination processing 22*b* determines that the synonym period of the synonym source OW whose occurrence number is the largest and the synonym candidate EW is started at the start point of the time interval PD of the synonym candidate EW.

In the case shown in FIG. 5, the synonym source search unit 18 records the occurrence number that is the search result of the synonym source OW to a synonym source table 10B. The synonym period commencement determination unit 22 executes the largest number determination processing 22*b* by referring to the synonym source table 10B.

In the case shown in FIG. 3, the occurrence number processing 22*a* calculates the occurrence number of a plurality of synonym sources OW in the time interval PD[5]. The synonym sources OW as the search target are the synonym sources OW[4], [5], and [6] stored by the storage module 10 in advance as being associated with the synonym candidate EW when acquiring the time interval PD[5]. In the case shown in FIG. 3, the occurrence number processing 22*a* calculates the occurrence number of the synonym sources OW[4], [5], and [6] in the time interval PD[5], and records those to the synonym source table 10B. Regarding the synonym source OW whose occurrence number is zero, calculation is not necessary.

Further, the largest number processing module 22*b* selects the synonym source OW[5] with the largest occurrence number "90" shown in FIG. 5, and determines that the synonym relation between the synonym source OW[5] and the synonym candidate EW is started at the start point of the time interval PD [5].

The determination regarding the synonym period start based on the occurrence number is effective for determining the synonym relation with respect to the synonym source OW that attracts attentions normally.

Next, a processing example using the occurrence ratio will be described.

When making determination with the occurrence ratio, the synonym period commencement determination unit 22 determines the synonym source OW having the largest occurrence ratio between the occurrence number per unit time in the time interval PD and the occurrence number per unit time before the time interval to be in a synonym relation with the synonym candidate EW. Further, the synonym period commencement determination unit 22 determines the start point of the time interval PD as the start point of the synonym relation between the synonym candidate EW and the synonym source OW.

Figure 6:
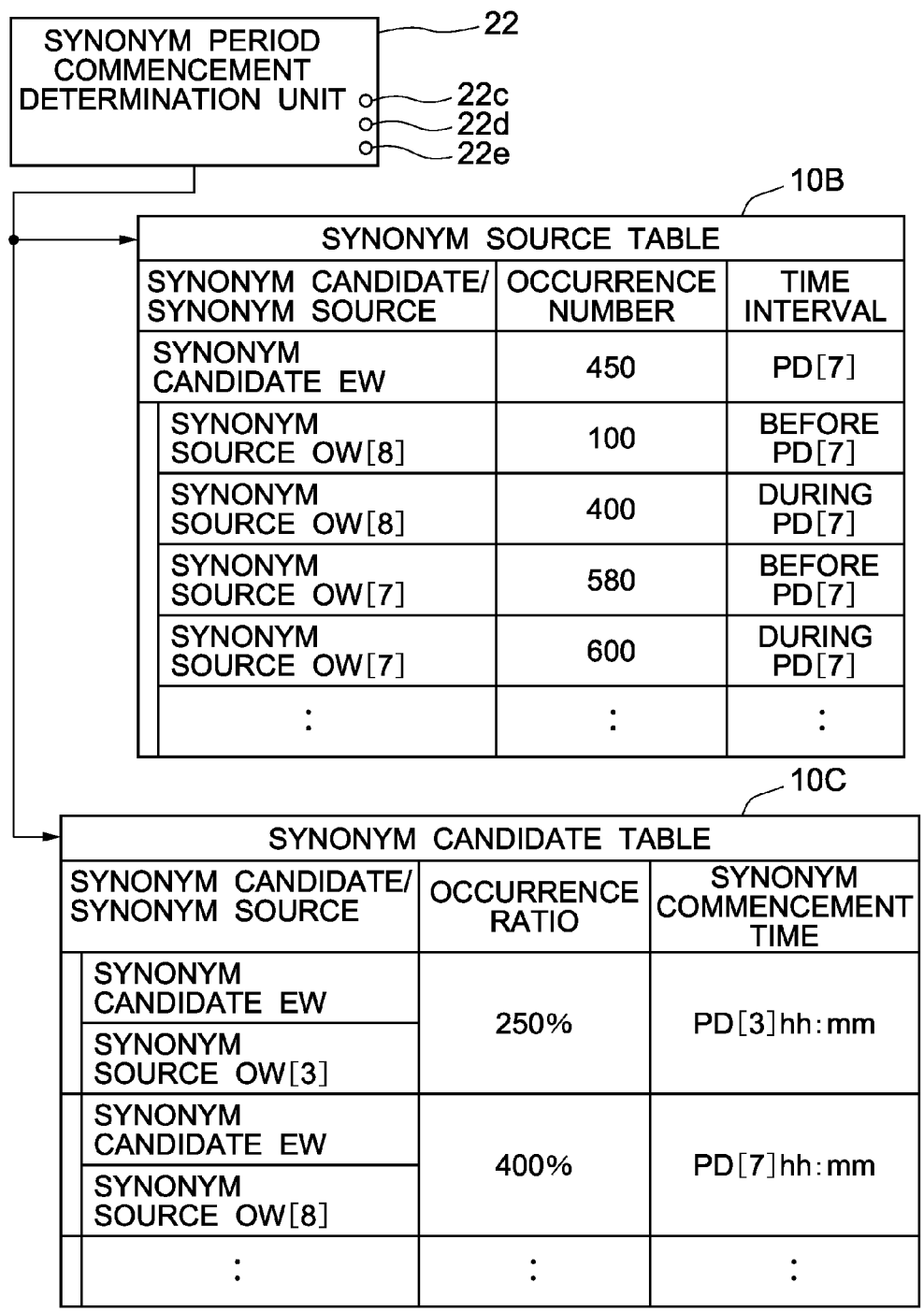
FIG. 6 is an explanatory chart showing another structural example of the synonym period determination unit disclosed in FIG. 5 and an example of a table to be used.

FIG. 6 shows an example of the determination processing with the occurrence ratio. In this case, for making determination based on the occurrence ratio, the synonym period commencement determination unit 22 includes in-time interval processing 22*c*, pre-time interval processing 22*d*, and ratio determination processing 22*e*.

The in-time interval processing 22*c* calculates the occurrence number of one or more synonym sources OW per unit time associated with the synonym candidate EW in the time interval PD where the synonym candidate EW is searched in the text set TX. The pre-time interval processing 22*d* calculates the occurrence number of each of the synonym candidates OW per unit time before the time interval PD.

Further, the ratio determination processing 22*e* determines that the synonym period with the synonym source OW having the largest ratio of the occurrence number in the time interval PD with respect to the occurrence number before the time interval PD started at the start point of the time interval PD of the synonym candidate EW.

That is, the ratio determination processing 22*e* makes a comparison with the occurrence number before the start point of the time interval PD, and determines that the synonym period started at the start point of the time interval PD of the synonym candidate EW when the occurrence number in the time interval PD is larger.

In the case shown in FIG. 6, the synonym source search unit 18 calculates the occurrence number of the synonym candidate EW before the time interval PD as well and stores the occurrence number of the synonym source OW to the synonym source table 10B.

Further, the ratio determination processing 22e stores the calculated occurrence ratio to a synonym candidate table 10C.

Processing steps based on the occurrence ratio will be described by using the time interval PD[7] shown in FIG. 3 by referring to flowcharts of FIG. 7 and FIG. 8.

Figure 7:
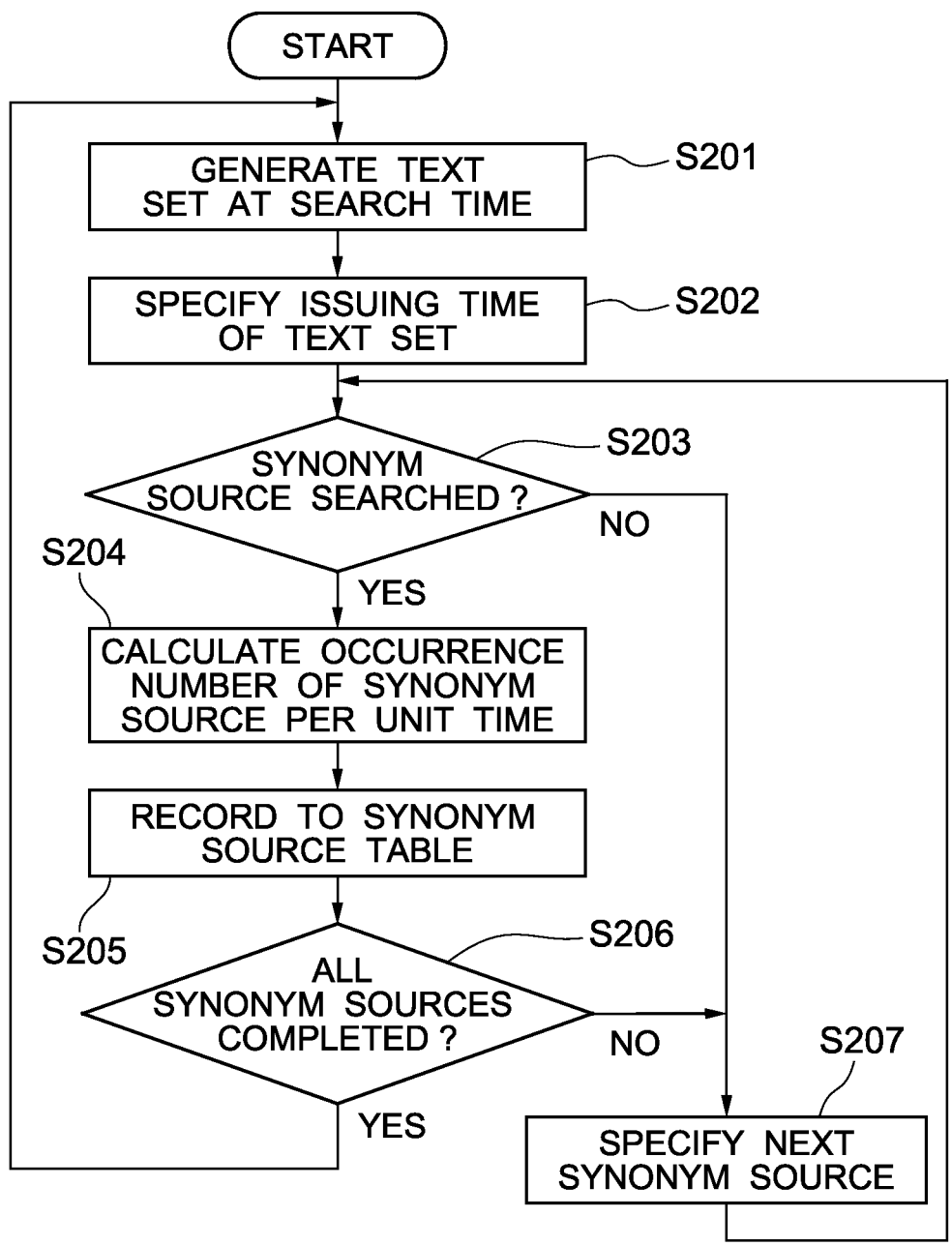
FIG. 7 is a flowchart showing an example of processing for calculating the occurrence number of a synonym source word used in another structural example of the synonym period determination unit shown in FIG. 6.

First, the text gathering unit 14 searches for the texts via the network 96 at a cycle or time (search time) defined in advance and generates the text set TX (FIG. 7: step S201). The text gathering unit 14 further specifies the issuing time of the text (FIG. 7: step S202).

Subsequently, the synonym source search unit 18 sequentially searches all the synonym sources OW registered in the storage module 10 (FIG. 7: steps S203, S207). When the synonym sources OW are searched, the synonym source search unit 18 calculates the occurrence number in the text set TX per unit time (FIG. 7: step S204), and records it to the synonym source table 10B (FIG. 7: step S205).

When the search for all the synonym sources OW for the collected text set TX ends, next text gathering is set to be on standby. When there are synonym sources whose occurrence number is not calculated, a next synonym source is specified (FIG. 7: step S207) and searched (FIG. 7: step S203).

When the synonym candidate EW and the time interval PD[7] are specified, the synonym source search unit 18 records the occurrence number (100) of the synonym source OW[8] in the period before the time interval PD[7] and the occurrence number (400) of the synonym source OW[8] in the time interval PD[7] as shown in the synonym source table 10B of FIG. 6.

Figure 8:
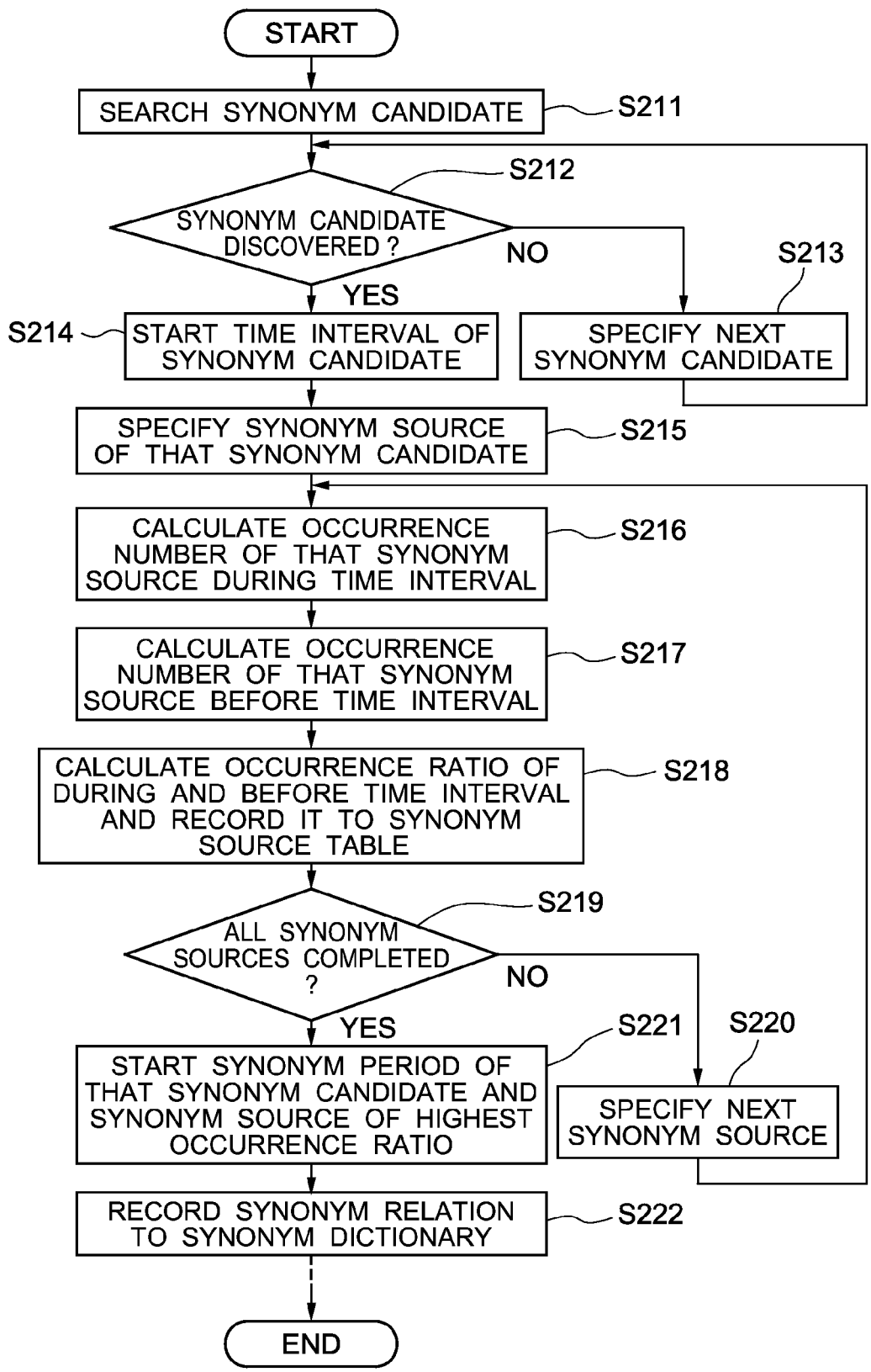
FIG. 8 is a flowchart showing an example of processing for determining the start of a synonym period with a synonym candidate by using the occurrence number of the synonym source word.

Referring to the flowchart of FIG. 8, first, the synonym candidate search unit 16 sequentially searches for the synonym candidates EW registered in the synonym expression candidate storage unit 10 (FIG. 8: steps S211, S213). When more than a predetermined number of synonym candidates EW are discovered (FIG. 8: step S212), the synonym period commencement determination unit 22 starts the time interval PD of the synonym candidate EW by taking the issuing time of the discovered text as the start point. In the case shown in FIG. 3, the time interval PD[7] is started.

Subsequently, the in-time interval processing 22c of the synonym period commencement determination unit 22 calculates the occurrence number of the synonym source OW in the time interval PD[7] where the synonym candidate EW is searched (FIG. 8: step S216), and records it to the synonym source table 10B. Here, not the shortest time unit shown in FIG. 3 but the total number (400) of a specific time may be used.

Further, the pre-time interval processing 22d calculates the occurrence number (100) that is also the total number of a specific time before the time interval PD of each of the synonym sources OW (FIG. 8: step S217), and records it to the synonym source table 10B.

Further, the ratio determination processing 22e calculates the ratio (400%) of the occurrence number (400) in the time interval PD with respect to the occurrence number (100) before the time interval PD (step S218). The ratio determination processing 22e further selects the synonym source OW[8] whose occurrence ratio is the largest, and determines that the synonym period with the synonym source OW[8] started at the start point of the time interval PD[7] of the synonym candidate EW (FIG. 8: step S221).

Further, the synonym period commencement determination unit 22 records the synonym relation that is the time interval synonym to the synonym dictionary 32 (FIG. 8: step S222).

The synonym period start determination processing based on the occurrence ratio shown in FIG. 8 is effective for extracting the synonym relation with the synonym source OW that attracts low attention normally.

Note here that operation contents (particularly each of the operation steps in FIG. 4, FIG. 7, and FIG. 8) of the operations of each of the above-described structures may be put into programs to be executable by a computer, and those may be executed by a computer that is provided to the synonym relation determination/specification module 12 which executes each of the above-described steps. This is also the same for other embodiments.

In that case, the acquired programs may be recorded in a non-transitory recording medium such as a DVD, a CD, or a flash memory. In such case, the programs are read out from the recording medium and executed by the computer.

As described above, with the first embodiment, it is possible to determine the time interval synonym by the information processing using the occurrence of the synonym source OW in the manner described above. More specifically, it is possible to determine the time interval synonym with a clear start time.

(Second Embodiment)

Next, a second embodiment of the present invention will be described by referring to FIG. 9 to FIG. 10

Figure 9:
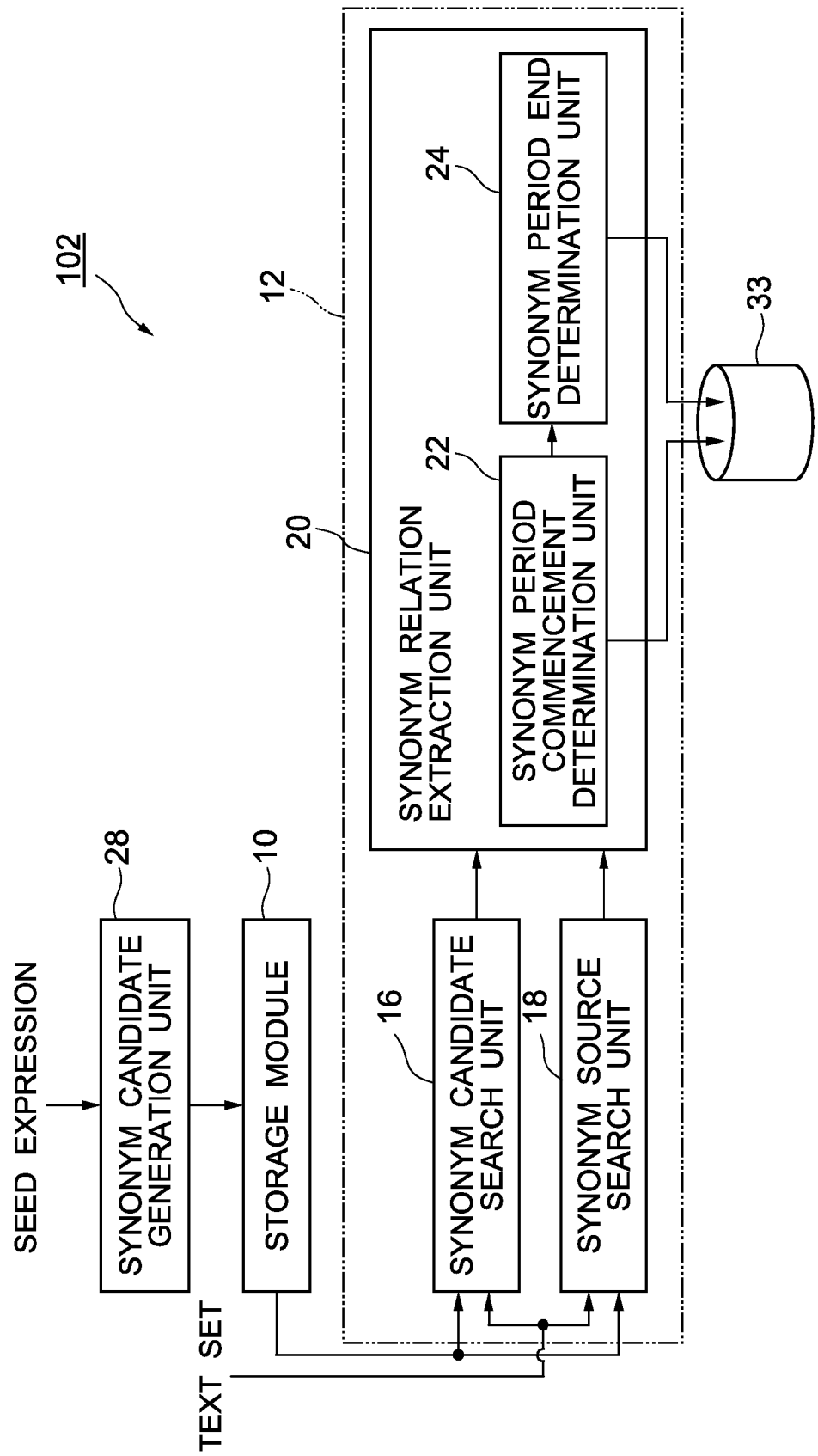
FIG. 9 is a block diagram showing a second embodiment of a synonym relation determination device according to the present invention.

First, in the second embodiment shown in FIG. 9, a synonym relation determination device 102 is characterized to include a synonym period end determination unit 24 for determining the end of a synonym period in addition to each of the structures of the first embodiment disclosed in FIG. 1 described above.

That is, in the second embodiment, the synonym relation determination/specification module 12 includes the synonym period end determination unit 24 which determines that the synonym period is ended at the point where the occurrence of the synonym candidate EW is decreased to be less than a condition set in advance in the text set TX that is in the order of the issuing time. Further, the synonym period end determination unit 24 determines that the synonym period is ended at the point where the occurrence of the synonym candidate EW is decreased, so that it is possible to specify the period where the meaning of the polysemous and ambiguous synonym candidate EW is established within a specific period.

Figure 10:
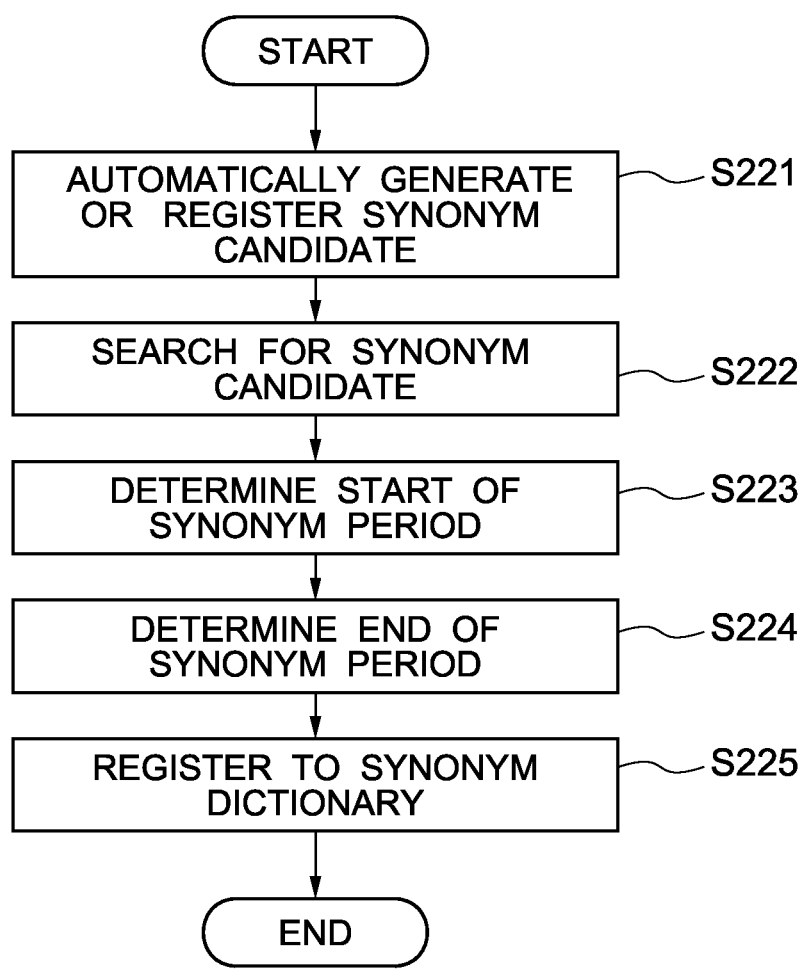
FIG. 10 is a flowchart showing operations of the second embodiment disclosed in FIG. 9.

FIG. 10 is a flowchart showing an example of the information processing executed by the synonym relation determination device 102 according to the second embodiment. First, the synonym expression generation unit 30 generates synonym candidates EW from a seed expression, and records those to the synonym expression candidate storage unit 10 (FIG. 10: step S221).

Then, the synonym candidate search unit 16 reads the text set TX, and detects the time interval PD where the occurrence number of the synonym candidates EW recorded in the synonym candidate storage unit 10 per unit period is increased (FIG. 10: step S222).

Further, the synonym period commencement determination unit 22 determines which of the synonym sources OW the synonym candidate EW detected by the synonym candidate search unit 16 is in a synonym relation, and determines the start point of the synonym relation (FIG. 10: step S223).

In the case shown in FIG. 10, the synonym period end determination unit 24 determines that the synonym relation is cancelled when the occurrence number of the synonym candidate EW determined as being in the synonym relation by the synonym period commencement determination unit 22 per unit period becomes equal to or less than an end threshold value (FIG. 10: step S224), and registers the end time of the synonym relation to the synonym dictionary 32 (FIG. 10: step S224).

Next, effects of the second embodiment will be described.

In the embodiment, the end time of the synonym relation can be outputted. Therefore, it is possible to correctly determine the time interval PD where the synonym relation is established.

(Third Embodiment)

Next, a third embodiment of the present invention will be described by referring to FIG. 11 to FIG. 12.

Figure 11:
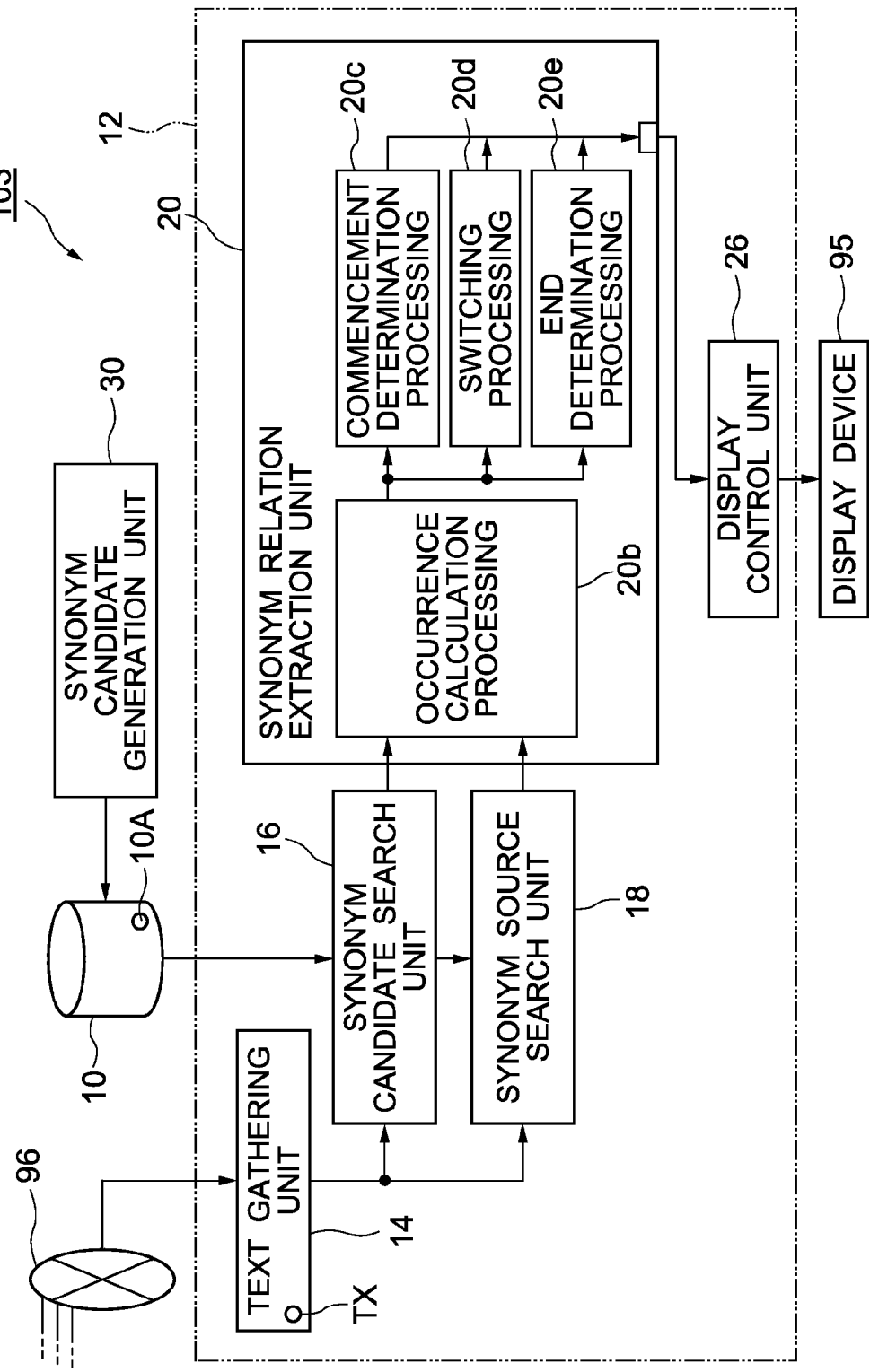
FIG. 11 is a block diagram showing a third embodiment of a synonym relation determination device according to the present invention.

The third embodiment is so characterized that there is a single synonym source in the time interval PD and start, switching, and end of the synonym relation thereof are determined First, in a synonym relation determination device 103 of the third embodiment shown in FIG. 11, the synonym relation extraction unit 20 includes occurrence calculation processing 20b, start determination processing 20c, switching processing 20d, and end determination processing 20e.

The occurrence calculation processing 20b calculates the occurrence of a plurality of synonym sources OW associated with the synonym candidate EW when the synonym candidate EW is searched in the text set TX.

Regarding the synonym source OW whose occurrence number is the largest among the synonym sources OW whose occurrence exceeds a start threshold value set in advance, the start determination processing 20c determines that a synonym relation between the synonym candidate EW is started at the point where the occurrence exceeds the threshold value.

When the occurrence of the synonym OW becomes lower than the occurrence of other synonym sources OW after the synonym relation is started, the switching processing 20d judges that the synonym relation is ended at the point where the occurrence becomes less and determines that a synonym relation is started anew regarding the synonym source OW with the largest occurrence.

When the occurrence becomes less than the end threshold value set in advance after the synonym relation is started, the end determination processing 20e determines that the synonym relation is ended at the point where the occurrence becomes less.

With such structures, it is possible to determine the meaning of the polysemous synonym candidate EW to be a still highly possible meaning.

Other structures are the same as those of the first embodiment described above.

This will be described in more details.

Figure 12:
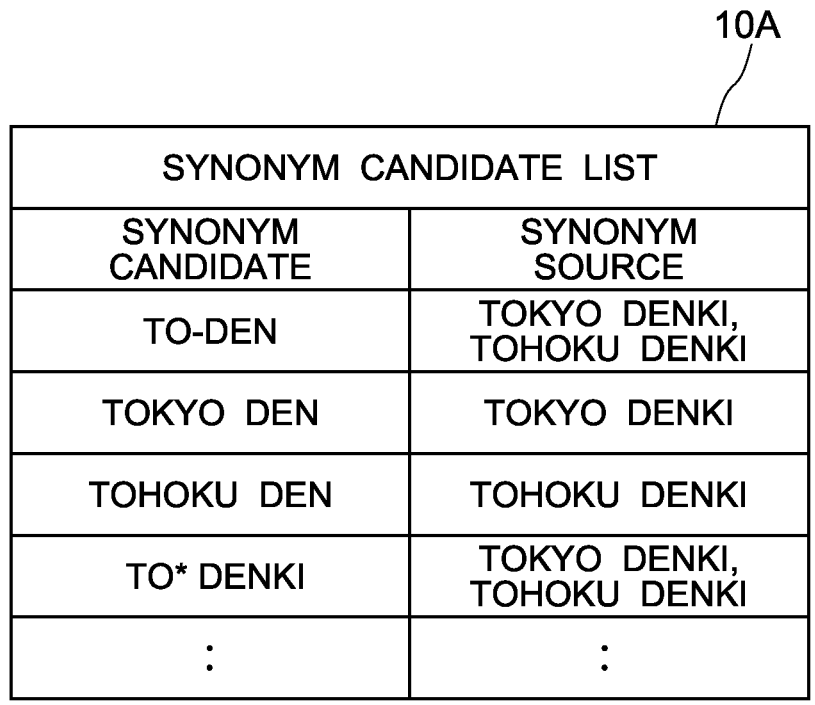
FIG. 12 is an explanatory chart showing an example of a synonym candidate list used in the third embodiment disclosed in FIG. 11.

Here, assumed is a case where "Tokyo Denryoku" and "Tohoku Denryoku" are given as seed expressions (synonym sources) as shown in FIG. 12.

First, the synonym candidate generation unit 30 generates a plurality of synonym candidates EW through generating an abbreviation by leaving the front letter of a morpheme of a synonym source OW and by generating a cipher through replacing a letter of the synonym source OW with "*". For example, in a case where the seed expression (synonym source OW) is "Tokyo Denryoku", an abbreviation such as "To-Den" or "Tokyo Den" or a cipher such as "To* Denryoku" is generated.

As described, while "To* Denryoku" (synonym candidate EW) is considered as a cipher of "Tokyo Denryoku" (synonym source OW[10]), this can be also a cipher of "Tohoku Denryoku" (synonym source OW[11]). As in this case, the content indicated by "To* Denryoku" (synonym candidate EW) is ambiguous so that it can be "Tokyo Denryoku" (synonym source OW[10]) or "Tohoku Denryoku" (synonym source OW[11]).

Further, in a case where the seed expression (synonym source OW) is "Tohoku Denryoku", an abbreviation such as "To-Den" or "Tohoku Den" or a cipher such as "To* Denryoku" is generated. In the manner described above, the synonym candidate list 10A shown in FIG. 12 or such data is stored in the storage module 10.

At this time, "To-Den" and "To* Denryoku" are generated from both "Tokyo Denryoku" and "Tohoku Denryoku", so that those are the ambiguous synonym candidates EW as described above.

Further, actually, there is a possibility that the content indicated by "To* Denryoku" changes to "Tokyo Denryoku" or "Tohoku Denryoku" depending on the time.

Figure 13:
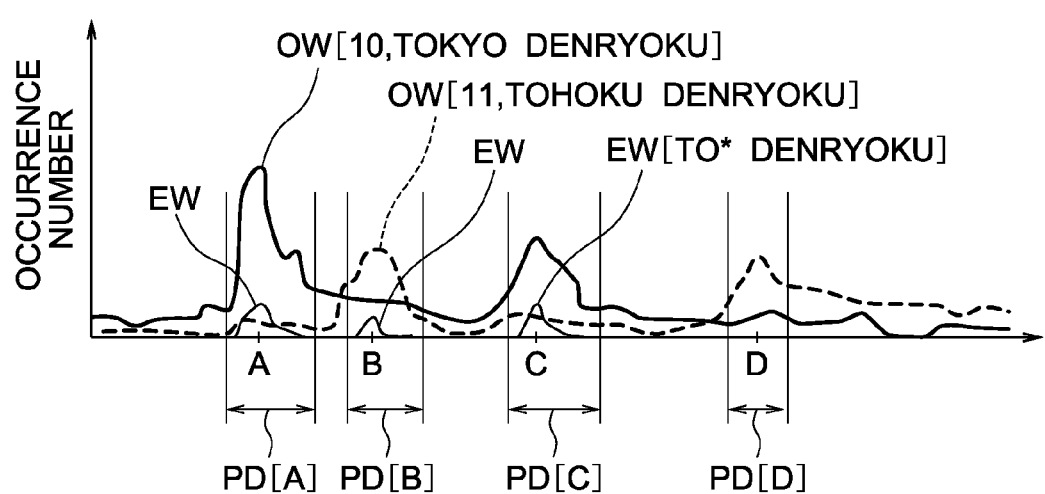
FIG. 13 is a graph showing an example of the occurrence number of synonym candidates and a synonym source word in a text set.

For example, in the case shown in FIG. 13, "To* Denryoku" (synonym candidate EW) indicates "Tokyo Denryoku" (synonym source OW[10]) in the time interval PD[A] and the time interval PD[C] but indicates "Tohoku Denryoku" (synonym source OW[11]) in the time interval PD[B], in which the synonym relation changes depending on the time.

Here, and information processing example of the third embodiment will be described by referring to FIG. 11 described above.

First, the synonym candidate generation unit 30 generates a plurality of synonym candidates EW through generating an abbreviation by leaving the front letter of a morpheme of a seed expression and by generating a cipher through replacing a letter of the seed expression with "*". Then, the points at which the synonym candidate EW and the synonym source OW appear (suddenly) are detected in the text set TX by the synonym candidate search unit 16 and the synonym source search unit 18. For each text in the text set TX, issuing time such as crawl time, write time, or the like is given. Based thereupon, the points at which the synonym candidate EW and the synonym source OW appear are detected.

Further, the synonym relation extraction unit 20 counts the frequency of the occurrence of the "Tokyo Denryoku" (synonym source OW[11]), "Tohoku Denryoku" (synonym source OW[11]), and "To* Denryoku" (synonym candidate EW) in the text set TX (the occurrence calculation processing 20b) and, in the case of the occurrence frequency shown in FIG. 13, the time interval PD[A], the time interval PD[B], and the time interval PD[C] of FIG. 13 are calculated.

The synonym relation extraction unit 20 determines the synonymity. For example, in the time interval PD[A] of FIG. 13, there are two synonym sources "Tokyo Denryoku" and "Tohoku Denryoku" for "To* Denryoku". Provided that the occurrence number of "Tokyo Denryoku" in the time interval PD[A] per day is "800" and that of "Tohoku Denryoku" per day is "150", "Tokyo Denryoku" appears more. Thus, it is determined that "Tokyo Denryoku" and "To* Denryoku" are in a synonym relation from the start point of the time interval PD[A] (the start determination processing 20c), and it is registered to the synonym dictionary 32 that "Tokyo Denryoku" and "To* Denryoku" are in a synonym relation from the start point of the time interval PD[A].

Similarly, the synonym relation extraction unit 20 determines that "To* Denryoku" and "Tohoku Denryoku" is in a synonym relation in the time interval PD[B] (the switching processing 20*d*) and determines that "To* Denryoku" and "Tokyo Denryoku" is in a synonym relation in the time interval PD[C] (the switching processing 20*d*).

As described above, the synonym relation of "To* Denryoku" changes depending on the time, and the synonym dictionary 32 is updated according to that. Thus, it is possible to correctly determine the time interval PD where the synonym relation whose meaning changes depending on the time is established.

Subsequently, the synonym relation extraction unit 20 monitors the occurrence number after the synonym relation is established. As in the time interval PD[D] shown in FIG. 13, when the occurrence of "To* Denryoku" becomes equal to or less than the threshold value and the occurrence number of "Tokyo Denryoku" that is in the synonym relation with "To* Denryoku" per unit period is also decreased to the level same as that of a normal state, the synonym relation extraction unit 20 determines that the synonym relation between "To* Denryoku" and the "Tokyo Denryoku" is ended (the end determination processing 20*e*), and registers the fact that the synonym relation is ended to the corresponding section of the synonym dictionary 32 along with the end time.

Thereby, it becomes possible to determine that the synonym relation is ended along with the end time, when the occurrence of the synonym candidate EW is decreased and it cannot be considered that the synonym relation is established.

Figure 14:
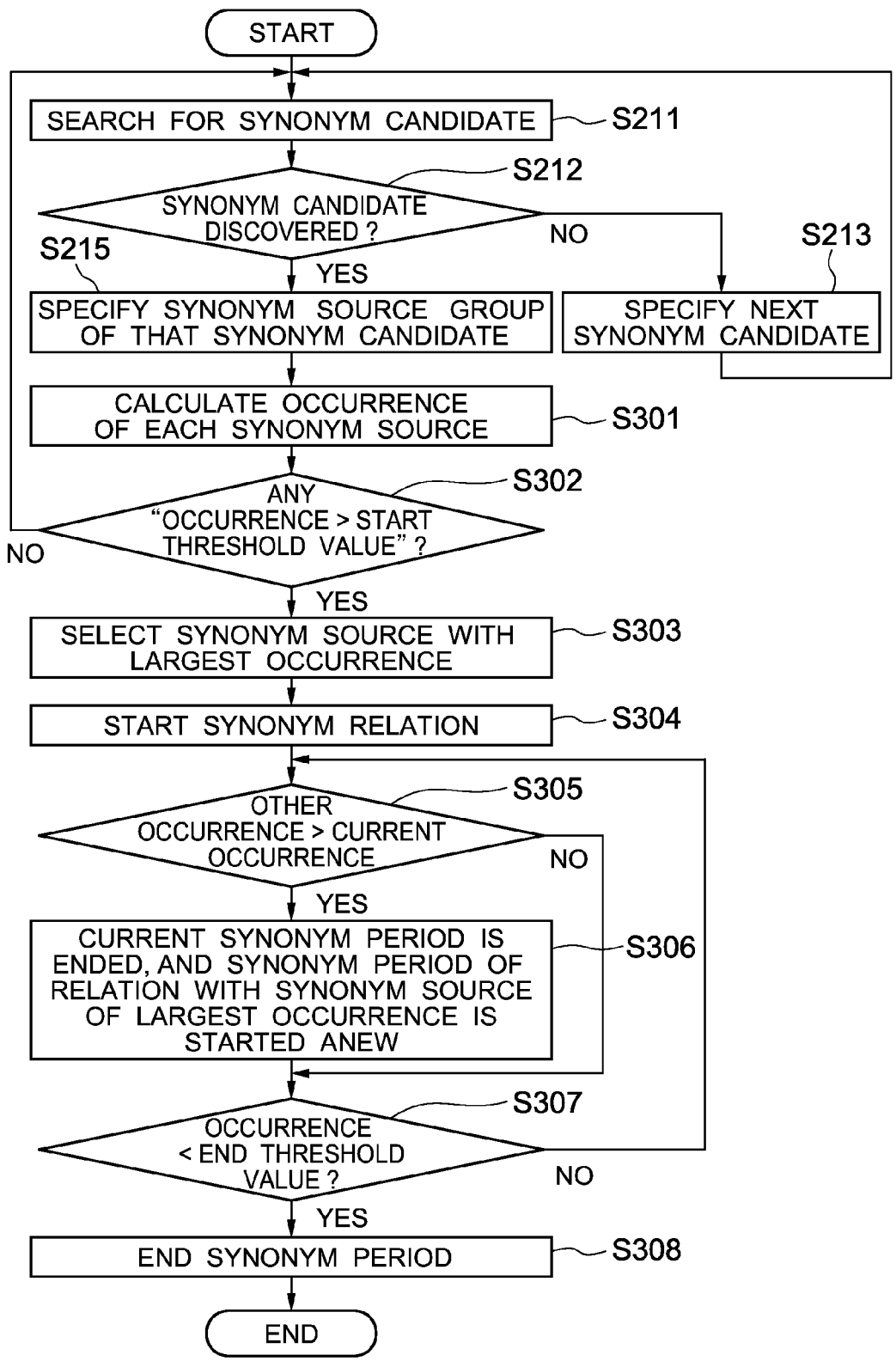
FIG. 14 is a flowchart showing an example of information processing in the third embodiment.

FIG. 14 is a flowchart showing another information processing example of the third embodiment. In the processing shown in FIG. 14, the outline of the information processing is the same while handling of the threshold value as well as the end and the like is different from those of the above-described information processing.

Here, the occurrence of the synonym source OW is calculated for every unit time in the manner shown in the flowchart of FIG. 7, and it is stored in the synonym source table 10B or the like.

First, as in the case of the processing shown in FIG. 8, the synonym relation extraction unit 20 searches for the synonym candidate EW recorded in the storage module 10 (FIG. 14: step S211). When no synonym candidate EW is discovered (FIG. 14: step S212), the synonym relation extraction unit 20 specifies a next synonym candidate EW (FIG. 14: step S213), and searches again (FIG. 14: step S211).

Assuming that "To* Denryoku" shown in FIG. 13 is searched (FIG. 14: step S212), the synonym relation extraction unit 20 refers to the synonym candidate list 10A shown in FIG. 12 and specifies "Tokyo Denryoku" (synonym source OW[10]) and "Tohoku Denryoku" (synonym source OW[11]) which are the synonym sources OW for "To* Denryoku" (FIG. 14: step S215).

After "To* Denryoku" (the synonym candidate EW) is searched in the text set TX (step S212), the occurrence calculation processing 20*b* calculates the occurrence of a plurality of associated synonym sources OW[10] and [11], respectively (FIG. 14: step S301).

Then, the start determination processing 20*c* checks whether or not the occurrence out of a plurality of synonym sources OW[10] and [11] has exceeded the start threshold value set in advance (FIG. 14: step S302). Subsequently, when determined as exceeding the start threshold value, the start determination processing 20*c* selects "Tokyo Denryoku" (synonym source OW[10]) whose occurrence is largest out of the synonym source OW group (FIG. 14: step S303). Then, the start determination processing 20*c* determines that a synonym relation with the synonym candidate EW is started at the point where the occurrence exceeds the start threshold value (FIG. 14: step S304).

In the case shown in FIG. 13, when reaching the time interval PD[B], the occurrence number of the synonym source OW[10] is decreased and the occurrence number of the synonym source OW[11] is increased.

When the occurrence (current occurrence) of the synonym source OW[10] (Tokyo Denryoku) becomes less than the occurrence (other occurrence) of the other synonym source OW[11] (Tohoku Denryoku) after the synonym relation is started (FIG. 14: step S305), the switching processing 20*d* determines that the synonym relation is ended at the point where the occurrence becomes lower, and determines that a synonym relation regarding the synonym source OW of the largest occurrence is started anew (FIG. 14: step S306). When the state where the current occurrence is larger than the other occurrence continues (FIG. 14: step S305), the switching processing 20*d* is not executed and the procedure is shifted to determine the end processing.

In the case shown in FIG. 13, it is assumed to have reached the time interval PD[C] while being remained in a state where the occurrence number of the synonym relation started by switching to "Tohoku Denryoku" has not become lower than the end threshold value (FIG. 14: step S307).

Here, it is switched again to the synonym relation with "Tokyo Denryoku" that is the other occurrence (FIG. 14: steps S305, S306).

When reaching the time interval PD[D] while the synonym relation with Tokyo Denryoku is being continued, the occurrence of the synonym source OW[10] becomes lower than the end threshold value (FIG. 14: step S307). In this case, the end determination processing 20*e* determines that the synonym relation is ended at the point where occurrence becomes lower (FIG. 14: step S308).

Next, described is a case where the synonym relation is not only stored to the synonym dictionary 32 but also display-controlled to a display device.

In FIG. 11 described above, in the synonym relation determination device 103 of the third embodiment, a display device 95 for displaying data is provided to the synonym relation determination/specification module 12. Further, the synonym relation determination/specification module 12 includes a display control unit 26.

This display control unit 26 display-controls the synonym candidate EW extracted by the synonym relation extraction unit 20, the synonym relation start point, the synonym source OW whose synonym relation is started at the synonym relation start point, and the synonym relation end point as time-interval synonym data TD. Thereby, the text set TX and the like including the information of time changes of the synonym relation can be displayed to the user.

Further, when the text set TX filtered by the time interval synonym is displayed, the productivity of the work can be improved greatly compared to the case where the user individually investigates and searches for the correspondence and the like with respect to the synonym candidates EW by handwork.

As examples of utilization of the present invention, the present invention can be applied to a rumor monitoring system, a rumor extraction system, and the like targeted on the Internet.

(Overall Operations of Embodiments)

Now, information processing in common to the synonym relation determination devices 101, 102, and 103 according to the first to third embodiments will be described by referring to hardware resources.

(Hardware Resources)

The information processing by the synonym relation determination devices 101, 102, and 103 according to the embodiments is the specific means executed by using software and the hardware resources in cooperation for calculating or processing the information according to the purpose of use.

Figure 15:
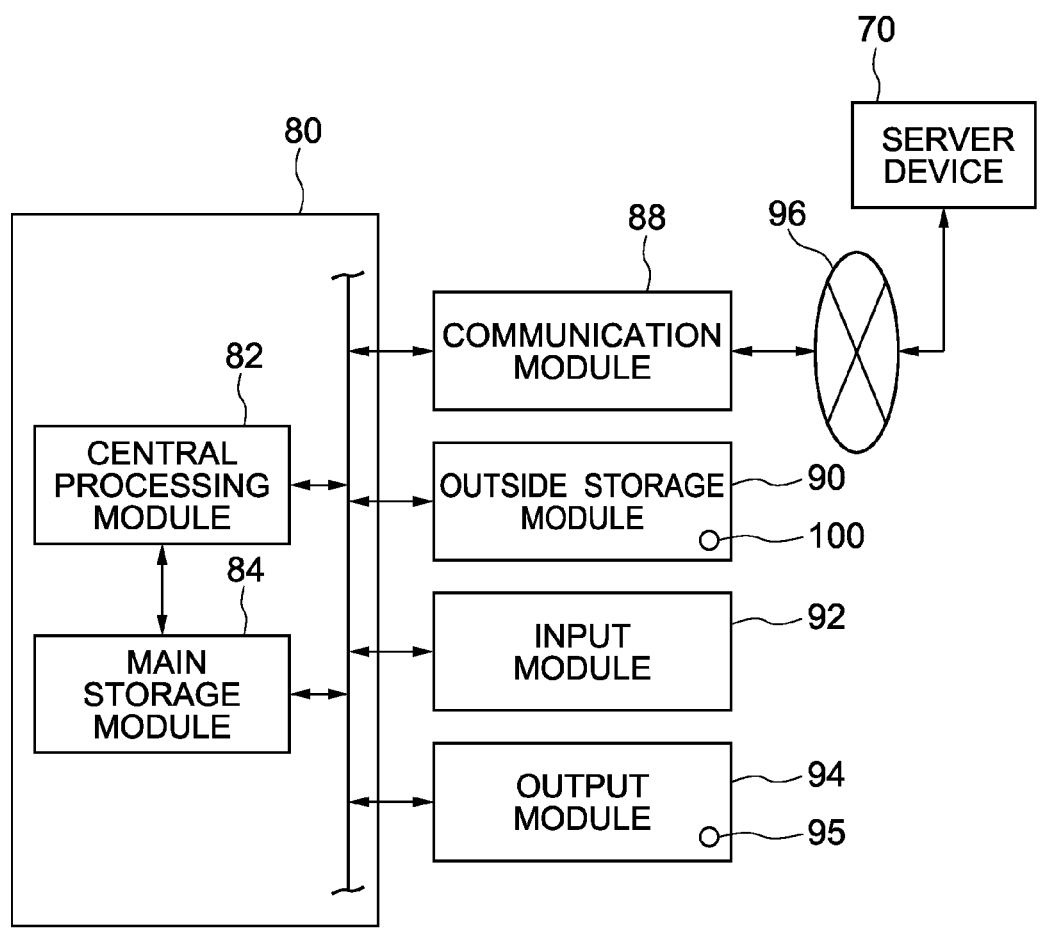
FIG. 15 is a block diagram showing a structural example of a hardware resource used in common to each of the embodiments of the present invention.

As shown in FIG. 15, a computer 80 for performing information processing is provided as the hardware resource. The computer 80 includes a calculation module 82 as a central processing unit (CPU) and a main storage module 86 which provides a storage region for the calculation module 82. The computer 80 generally includes peripheral equipment connected thereto via a data bus and an input/output interface. The peripheral equipment typically includes a communication module 88, an outside storage module 90, an input module 92, and an output module 94. The entire device including the peripheral equipment may be called as the computer 80 in some cases.

The communication module 88 controls communications with a server device 70 via a wired or a wireless network. The outside storage module 90 is an installed or portable recording medium which stores a program file 100 and data. The input module 92 is a keyboard, a touch panel, a pointing device, a scanner, or the like, which inputs data readable by the computer 80 according to operations by the user. The output module 94 displays and outputs the data and the like calculated by the computer 80 by a display, a printer, and the like.

The storage module 10 of the synonym relation determination devices 101, 102, and 103 according to the embodiments stores the data such as the synonym candidate list 10A by using the outside storage module 90 as the hardware resource. Further, the synonym relation determination/specification module 12 executes data processing on the text set TX by using the calculation module 82 that is the CPU as the hardware resource. That is, the synonym relation determination/specification module 12 can be achieved by the computer 80 that executes the program.

The new technical contents of each of the above-described embodiments can be summarized as follows. While a part of or a whole part of the embodiments can be summarized as follows as the new techniques, the present invention is not necessarily limited only to the followings.

(Supplementary Note 1)

A synonym relation determination device which includes: a synonym expression candidate storage unit 10 in which a prescribed synonym source expression and a plurality of synonym expression candidates as targets of a synonym relation are recorded in a mutually corresponding manner; and a synonym relation determination/specification module 12 which determines and specifies a synonym relation between the synonym expression candidates and the synonym source expression in texts inputted from outside based on a specific standard, wherein the synonym relation determination/specification module 12 includes:

a text gathering unit 14 which gathers the texts inputted from outside, and generates a text set whose issuing time can be specified;

a synonym candidate detection unit 12A which specifies and outputs a time interval where the synonym expression candidates are detected many times and a time interval where the synonym source expression is detected many times from the text set gathered by the text gathering unit 14; and a synonym period specification unit 12B which determines and specifies a time interval in which the synonym expression candidate and the synonym source expression are in a synonym relation as a synonym period based on a positional relation between the time interval where the synonym expression candidate is detected in the text set and the time interval where the synonym source expression is detected in the text set and based on detection frequency thereof.

(Supplementary Note 2)

The synonym relation determination device as depicted in Supplementary Note 1, wherein the synonym candidate detection unit 12A includes: a synonym candidate search unit 16 which detects and counts the synonym expression candidates from the text set with specifiable issuing time gathered by the text gathering unit, and specifies the time interval with a largest occurrence number per unit time (as a time interval where the synonym expression candidates exist); and a synonym source search unit 18 which detects and counts the synonym source expression from the text set with specifiable issuing time gathered by the text gathering unit, and specifies the time interval with a largest occurrence number per unit time (as a time interval where the synonym source expressions exist).

(Supplementary Note 3)

The synonym relation determination device as depicted in Supplementary Note 1 or 2, wherein the synonym period specification unit 12B includes: a synonym relation extraction unit 20 which extracts at least the synonym source expression whose occurrence number is largest within the text set in the time interval in which the synonym expression candidates are detected by the synonym candidate detection unit as a synonym source to be in a synonym relation; and a synonym period commencement determination unit 22 which determines that the extracted synonym expression is in a synonym relation with the synonym expression candidate, takes a start point of the time interval in which the both are in the synonym relation as a start point of the synonym period, and registers it along with the synonym period to a synonym dictionary provided in advance.

(Supplementary Note 4)

The synonym relation determination device as depicted in Supplementary Note 3, wherein the synonym period commencement determination unit 22 includes a function which, within the set in the time intervals where the synonym candidates are detected in the text set, determines also the synonym source expression having a largest occurrence ratio between the occurrence number per unit time in the time interval and the occurrence number per unit time before the rime interval as being in a synonym relation with the synonym expression candidate.

(Supplementary Note 5)

The synonym relation determination device as depicted in Supplementary Note 1, 2, 3, or 4 wherein the synonym period specification unit 12B includes a synonym period end determination unit 24 which determines that the synonym relation is cancelled at a point where the occurrence number per unit period of the synonym expression candidate determined and specified as being in the synonym relation by the synonym period commencement determination unit 22 of the synonym period specification unit 12B becomes equal to or lower than a threshold value set in advance.

(Supplementary Note 6) (Method Invention/Corresponding to Supplementary Note 1)

A synonym relation determination method used for a synonym relation determination device which includes: a synonym expression candidate storage unit 10 in which a prescribed synonym source expression and a plurality of synonym expression candidates as targets of a synonym relation are recorded in a mutually corresponding manner; and a synonym relation determination/specification module 12 which determines and specifies a synonym relation between the synonym expression candidates and the synonym source expression in texts inputted from outside based on a specific standard, wherein:

a text gathering unit of the synonym relation determination/specification module 12 gathers the texts inputted from outside and generates a text set whose issuing time can be specified based thereupon (a text gathering/generating step);

the synonym relation determination/specification module 12 determines and specifies a synonym relation between the synonym expression candidate and the synonym source expression contained in the generated text set based on a specific standard (a synonym relation specifying step);

in the step for specifying the synonym relation, a synonym candidate detection unit 12A of the synonym relation determination/specification module 12 searches and specifies a time interval where the synonym expression candidates are detected many times and a time interval where the synonym source expression is detected many times from the text set gathered, respectively (a synonym candidate detecting step); and subsequently, a synonym period specification unit 12B of the synonym relation determination/specification module 12 determines and specifies a time interval in which the synonym expression candidate and the synonym source expression are in a synonym relation as a synonym period based on a positional relation between the time interval where the synonym expression candidate is detected in the text set and the time interval where the synonym source expression is detected in the text set and based on detection frequency thereof (a synonym period specifying step).

(Supplementary Note 7) (Corresponding to Supplementary Note 2)

The synonym relation determination method as depicted in Supplementary Note 6, wherein:

in a step for detecting the synonym candidate, the synonym expression candidates are detected and counted from the text set gathered by the text gathering unit, and the time interval with a largest occurrence number per unit time is extracted and specified (a synonym candidate correspondence/time interval specifying step);

at about the same time, the synonym source expressions are detected and counted from the text set gathered by the text gathering unit, and the time interval with a largest occurrence number per unit time is extracted and specified (a synonym candidate correspondence/time interval specifying step); and operation contents in specifying steps of each time interval mentioned above are executed by the synonym candidate detection unit 12A.

(Supplementary Note 8) (Corresponding to Supplementary Note 3)

The synonym relation determination method as depicted in Supplementary Note 6, wherein:

in s step for specifying the synonym interval, at least the synonym source expression whose occurrence number is largest within the text set in the time interval in which the synonym expression candidates are detected in the step for detecting the synonym candidate is extracted as the synonym source to be in a synonym relation (a synonym relation extracting step);

at about the same time, the extracted synonym expression is determined to be in a synonym relation with the synonym expression candidate, a start point of the time interval in which the both are in the synonym relation is taken as a start point of the synonym period, and it is registered along with the synonym period to a synonym dictionary provided in advance (a synonym period registering step); and operation contents of each of the steps for extraction/registration are executed by the synonym period specification module 12B.

(Supplementary Note 9) (Corresponding to Supplementary Note 5)

The synonym relation determination method as depicted in Supplementary Note 6, 7, or 8, wherein the occurrence number per unit period of the synonym expression candidate determined as being in the synonym relation by the synonym period specification unit 12B is continuously counted and when the occurrence number becomes equal to or lower than a threshold value set in advance, the synonym period end determination unit 24 of the synonym period specification unit 12B determines that the synonym relation is cancelled.

(Supplementary Note 10) (Program Invention/Corresponding to Supplementary Note 6)

A synonym relation determination program used for a synonym relation determination device which includes: a synonym expression candidate storage unit 10 in which a prescribed synonym source expression and a plurality of synonym expression candidates as targets of a synonym relation are recorded in a mutually corresponding manner; and a synonym relation determination/specification module 12 which determines and specifies a synonym relation between the synonym expression candidates and the synonym source expression in texts inputted from outside based on a specific standard, and the program includes:

a text gathering/generation processing function which gathers the texts inputted from outside and generates based thereupon a text set whose issuing time can be specified; and a synonym relation specification processing function which executes processing for determining and specifying a synonym relation between the synonym expression candidate and the synonym source expression contained in the generated text set based on a specific standard; wherein:

the synonym relation specification processing function includes a synonym candidate detection processing function which executes processing for searching and specifying a time interval where the synonym expression candidates are detected many times and a time interval where the synonym source expression is detected many times from the text set gathered by the text gathering unit, respectively, and a synonym period specification processing function which determines and specifies a time interval in which the synonym expression candidate and the synonym source expression are in a synonym relation as a synonym period based on a positional relation between the time interval where the synonym expression candidate is detected in the text set and the time interval where the synonym source expression is detected in the text set and based on detection frequency thereof; and the program causes a computer provided to the synonym relation determination/specification module 12 to execute each of the processing functions.

(Supplementary Note 11) (Corresponding to Supplementary Note 7)

The synonym relation determination program as depicted in Supplementary Note 10, wherein:

the synonym candidate detection processing function includes a synonym candidate correspondence/time interval specification processing function which detects and counts the synonym expression candidates from the text set whose issuing time can be specified gathered by the text gathering unit, and extracts and specifies the time interval with a largest occurrence number per unit time, and a synonym source correspondence/time interval specification processing function which detects and counts the synonym source expressions from the text set whose issuing time can be specified gathered by the text gathering unit, and extracts and specifies the time interval with a largest occurrence number per unit time; and the program causes a computer provided to the synonym relation determination/specification module 12 to execute each of the processing functions.

(Supplementary Note 12) (Corresponding to Supplementary Note 8)

The synonym relation determination program as depicted in Supplementary Note 8, wherein:

the synonym candidate detection processing function includes a synonym relation extraction processing function which extracts at least the synonym source expression whose occurrence number is largest within the text set in the time interval in which the synonym expression candidates are detected by the synonym candidate detection processing function as the synonym source to be in a synonym relation, and a synonym period registration processing function which, at the same time, determines the extracted synonym expression to be in a synonym relation with the synonym expression candidate, takes a start point of the time interval in which the both are in the synonym relation as a start point of the synonym period, and registers it along with the synonym period to a synonym dictionary provided in advance; and the program causes a computer provided to the synonym relation determination/specification module 12 to execute each of the processing functions.

(Supplementary Note 13) (Corresponding to Supplementary Note 9)

The synonym relation determination program as depicted in Supplementary Note 10, 11, or 12, wherein:

the synonym relation specification processing function includes a synonym period end determination function which, when continuously counts occurrence number per unit period of the synonym expression candidate determined as being in the synonym relation and when the occurrence number becomes equal to or lower than a threshold value set in advance, determines that the synonym relation is cancelled; and the program causes a computer provided to the synonym relation determination/specification module 12 to execute the function.

This application claims the Priority right based on Japanese Patent Application No. 2012-82722 filed on Mar. 30, 2012 and the disclosure thereof is hereby incorporated by reference in its entirety.

INDUSTRIAL APPLICABILITY

The present invention can be employed for all natural word data processing that uses the synonym relations.

REFERENCE NUMERALS

10 Storage module
12 Synonym relation determination/specification module
12A Synonym candidate detection unit
12B Synonym period specification unit
14 Text gathering unit
16 Synonym candidate search unit
18 Synonym source search unit
18a Plural occurrence processing
20 Synonym relation extraction unit
22 Synonym period commencement determination unit
24 Synonym period end determination unit
26 Display control unit
30 Synonym candidate generation unit
32 Synonym dictionary
EW Synonym candidate
OW Synonym source
PD Time interval
D Time-interval synonym data
TX Text set

The invention claimed is:

1. A synonym relation determination device, comprising: a synonym expression candidate storage unit in which a prescribed synonym source expression and a plurality of synonym expression candidates as targets of a synonym relation are recorded in a mutually corresponding manner; and a synonym relation determination/specification module which determines and specifies a synonym relation between the synonym expression candidates and the synonym source expression in texts inputted from outside based on a specific standard, wherein the synonym relation determination/specification module comprises:

a text gathering unit which gathers the texts inputted from outside, and generates a text set whose issuing time can be specified;

a synonym candidate detection unit which specifies and outputs a time interval where the synonym expression candidates are detected many times and a time interval where the synonym source expression is detected many times from the text set gathered by the text gathering unit; and a synonym period specification unit which determines and specifies a time interval in which the synonym expression candidate and the synonym source expression are in a synonym relation as a synonym period based on a positional relation between the time interval where the synonym expression candidate is detected in the text set and the time interval where the synonym source expression is detected in the text set and based on detection frequency thereof.

2. The synonym relation determination device as claimed in claim 1, wherein
the synonym candidate detection unit comprises: a synonym candidate search unit which detects and counts the synonym expression candidates from the text set whose issuing time can be specified gathered by the text gathering unit, and specifies the time interval with a largest occurrence number per unit time as a time interval where the synonym expression candidates exist; and a synonym source search unit which detects and counts the synonym source expression from the text set whose issuing time can be specified gathered by the text gathering unit, and specifies the time interval with a largest occurrence number per unit time as a time interval where the synonym source expressions exist.

3. The synonym relation determination device as claimed in claim 1, wherein
the synonym period specification unit comprises: a synonym relation extraction unit which extracts at least the synonym source expression whose occurrence number is largest within the text set in the time interval in which the synonym expression candidates are detected by the synonym candidate detection unit as a synonym source to be in a synonym relation; and a synonym period commencement determination unit which determines that the extracted synonym expression is in a synonym relation with the synonym expression candidate, takes a start point of the time interval in which the both are in the synonym relation as a start point of the synonym period, and registers it along with the synonym period to a synonym dictionary provided in advance.

4. The synonym relation determination device as claimed in claim 3, wherein
the synonym period commencement determination unit includes a function which, within the set in the time intervals where the synonym candidates are detected in the text set, determines also the synonym source expression having a largest occurrence ratio between the occurrence number per unit time in the time interval and the occurrence number per unit time before the rime interval as being in a synonym relation with the synonym expression candidate.

5. The synonym relation determination device as claimed in claim 1, wherein
the synonym period specification unit comprises a synonym period end determination unit which determines that the synonym relation is cancelled at a point where the occurrence number per unit period of the synonym expression candidate determined and specified as being in the synonym relation by the synonym period commencement determination unit of the synonym period specification unit becomes equal to or lower than a threshold value set in advance.

6. A synonym relation determination method used for a synonym relation determination device comprising: a synonym expression candidate storage unit in which a prescribed synonym source expression and a plurality of synonym expression candidates as targets of a synonym relation are recorded in a mutually corresponding manner; and a synonym relation determination/specification module which determines and specifies a synonym relation between the synonym expression candidates and the synonym source expression in texts inputted from outside based on a specific standard, wherein:
a text gathering unit of the synonym relation determination/specification module gathers the texts inputted from outside and generates a text set whose issuing time can be specified based thereupon;
the synonym relation determination/specification module determines and specifies a synonym relation between the synonym expression candidate and the synonym source expression contained in the generated text set based on a specific standard;
in a step for specifying the synonym relation, a synonym candidate detection unit of the synonym relation determination/specification module searches and specifies a time interval where the synonym expression candidates are detected many times and a time interval where the synonym source expression is detected many times from the text set gathered, respectively; and
then, a synonym period specification unit of the synonym relation determination/specification module determines and specifies a time interval in which the synonym expression candidate and the synonym source expression are in a synonym relation as a synonym period based on a positional relation between the time interval where the synonym expression candidate is detected in the text set and the time interval where the synonym source expression is detected in the text set and based on detection frequency thereof.

7. The synonym relation determination method as claimed in claim 6, wherein:
in a step for detecting the synonym candidate, the synonym expression candidates are detected and counted from the text set gathered by the text gathering unit, and the time interval with a largest occurrence number per unit time is extracted and specified;
at about the same time, the synonym source expressions are detected and counted from the text set gathered by the text gathering unit, and the time interval with a largest occurrence number per unit time is extracted and specified; and
operation contents in specifying steps of each time interval mentioned above are executed by the synonym candidate detection unit.

8. The synonym relation determination method as claimed in claim 6, wherein:
in s step for specifying the synonym interval, at least the synonym source expression whose occurrence number is largest within the text set in the time interval in which the synonym expression candidates are detected in the step for detecting the synonym candidate is extracted as a synonym source to be in a synonym relation;
at the same time, the extracted synonym expression is determined to be in a synonym relation with the synonym expression candidate, a start point of the time interval in which the both are in the synonym relation is taken as a start point of the synonym period, and it is registered along with the synonym period to a synonym dictionary provided in advance; and
operation contents of each of the steps for extraction/registration are executed by the synonym period specification module.

9. A non-transitory readable recording medium storing a synonym relation determination program used for a synonym relation determination device comprising: a synonym expression candidate storage unit in which a prescribed synonym source expression and a plurality of synonym expression candidates as targets of a synonym relation are recorded in a mutually corresponding manner; and a synonym relation determination/specification module which determines and specifies a synonym relation between the synonym expression candidates and the synonym source expression in texts inputted from outside based on a specific standard, the program including:
- a text gathering/generation processing function which gathers the texts inputted from outside and generates based thereupon a text set whose issuing time can be specified; and
- a synonym relation specification processing function which executes processing for determining and specifying a synonym relation between the synonym expression candidate and the synonym source expression contained in the generated text set based on a specific standard; wherein:
- the synonym relation specification processing function includes
- a synonym candidate detection processing function which executes processing for searching and specifying a time interval where the synonym expression candidates are detected many times and a time interval where the synonym source expression is detected many times from the text set gathered by the text gathering unit, respectively, and
- a synonym period specification processing function which determines and specifies a time interval in which the synonym expression candidate and the synonym source expression are in a synonym relation as a synonym period based on a positional relation between the time interval where the synonym expression candidate is detected in the text set and the time interval where the synonym source expression is detected in the text set and based on detection frequency thereof; and
- the program causes a computer provided to the synonym relation determination/specification module to execute each of the processing functions.

10. The non-transitory computer readable recording medium storing the synonym relation determination program as claimed in claim 9, wherein:
- the synonym candidate detection processing function includes a synonym candidate correspondence/time interval specification processing function which detects and counts the synonym expression candidates from the text set gathered by the text gathering unit, and extracts and specifies the time interval with a largest occurrence number per unit time, and
- a synonym source correspondence/time interval specification processing function which detects and counts the synonym source expressions from the text set gathered by the text gathering unit, and extracts and specifies the time interval with a largest occurrence number per unit time; and
- the program causes a computer provided to the synonym relation determination/specification module to execute each of the processing functions.

11. A synonym relation determination device, comprising: a synonym expression candidate storage unit in which a prescribed synonym source expression and a plurality of synonym expression candidates as targets of a synonym relation are recorded in a mutually corresponding manner; and synonym relation determination/specification means for determining and specifying a synonym relation between the synonym expression candidates and the synonym source expression in texts inputted from outside based on a specific standard, wherein
- the synonym relation determination/specification means comprises:
- text gathering means for gathering the texts inputted from outside, and generating a text set whose issuing time can be specified;
- synonym candidate detection means for specifying and outputting a time interval where the synonym expression candidates are detected many times and a time interval where the synonym source expression is detected many times from the text set gathered by the text gathering means; and
- synonym period specification means for determining and specifying a time interval in which the synonym expression candidate and the synonym source expression are in a synonym relation as a synonym period based on a positional relation between the time interval where the synonym expression candidate is detected in the text set and the time interval where the synonym source expression is detected in the text set and based on detection frequency thereof.

\* \* \* \* \*